United States Patent [19]
Bobick et al.

[11] Patent Number: 5,785,630
[45] Date of Patent: Jul. 28, 1998

[54] INTERACTIVE EXERCISE APPARATUS

[75] Inventors: Aaron F. Bobick, Newton; W. Thatcher Ulrich, Boston, both of Mass.; J. Bryan Lewis, Portland, Me.; Eliot Shepard, Boston; Peter Lehman, Arlington, both of Mass.

[73] Assignee: Tectrix Fitness Equipment, Inc., Irvine, Calif.

[21] Appl. No.: 743,715

[22] Filed: Nov. 6, 1996

Related U.S. Application Data

[63] Continuation-in-part of Ser. No. 457,242, Jun. 1, 1995, Pat. No. 5,690,582, which is a continuation-in-part of Ser. No. 189,896, Feb. 1, 1994, Pat. No. 5,466,200, which is a continuation-in-part of Ser. No. 12,305, Feb. 2, 1993, abandoned.

[51] Int. Cl.$^6$ .................................................. A63B 21/00
[52] U.S. Cl. .................. 482/4; 482/1; 482/3; 482/6; 482/57; 482/901
[58] Field of Search .................. 482/1–8, 52, 53, 482/57, 72, 900–902; 434/247, 253

[56] References Cited

U.S. PATENT DOCUMENTS

| | | |
|---|---|---|
| 3,686,776 | 8/1972 | Dahl . |
| 3,722,884 | 3/1973 | Brown . |
| 3,767,195 | 10/1973 | Dimick . |
| 3,903,613 | 9/1975 | Bisberg . |
| 4,049,262 | 9/1977 | Cunningham, Jr. . |

(List continued on next page.)

FOREIGN PATENT DOCUMENTS

| | | |
|---|---|---|
| 0 028 209 | 5/1981 | European Pat. Off. . |
| 0 255 142 | 2/1988 | European Pat. Off. . |
| 0 354 785 | 2/1990 | European Pat. Off. . |
| 9216659 U | 3/1993 | Germany . |
| G 94 13 402.2 | 11/1994 | Germany . |
| 2 194 369 | 3/1988 | United Kingdom . |
| WO87/00066 | 1/1987 | WIPO . |
| WO94/16774 | 8/1994 | WIPO . |
| WO94/16777 | 8/1994 | WIPO . |
| WO94/17860 | 8/1994 | WIPO . |

OTHER PUBLICATIONS

Virtual Reality Gallery at SIGGRAPH '91, "A Mountain Bike with Force Feedback for Indoor Exercise", 1 page.

Heartbeat® Personal Trainer, brochure, 4 pages.

(List continued on next page.)

*Primary Examiner*—Richard J. Apley
*Assistant Examiner*—Glenn E. Richman
*Attorney, Agent, or Firm*—Testa, Hurwitz & Thibeault, LLP

[57] ABSTRACT

An interactive exercise apparatus engages a user's mind and body. The apparatus comprises an exercise mechanism, a steering mechanism, and a control mechanism for manipulation by the user to achieve exercise, to indicate a direction of motion, and to interact with virtual objects in a simulated environment. The exercise mechanism can be, for example, the steps of a stair climbing simulator or the pedals of a bicycle, preferably a recumbent bicycle. A simulated environment (e.g., an interactive simulated three-dimensional environment or an interactive simulated three-dimensional fluid environment) is generated by a computer and displayed on a display system for the user. In one embodiment, the simulated environment comprises an enclosed space representing a game field. In this embodiment, an interactive competitive ball game is played using networked exercise apparatus. The user manipulates the exercise mechanism, the steering mechanism, and the control mechanism to travel throughout the game field and interact with virtual objects to score points. The computer controls the exercise mechanism and monitors the exercise mechanism, the steering mechanism, and the control mechanism to determine user position and the position of virtual objects in the simulated environment. The display provides a visual display of the user's position and the position of virtual objects in the simulated environment. A plurality of the interactive exercise apparatus can be networked together to allow group participation and competition in the simulated game.

8 Claims, 24 Drawing Sheets

U.S. PATENT DOCUMENTS

| | | |
|---|---|---|
| 4,141,630 | 2/1979 | Emmons . |
| 4,170,834 | 10/1979 | Smart . |
| 4,196,528 | 4/1980 | Foerst . |
| 4,358,105 | 11/1982 | Sweeney, Jr. . |
| 4,418,911 | 12/1983 | Bowers et al. . |
| 4,461,470 | 7/1984 | Astroth et al. . |
| 4,464,117 | 8/1984 | Foerst . |
| 4,478,407 | 10/1984 | Manabe . |
| 4,512,567 | 4/1985 | Phillips . |
| 4,527,980 | 7/1985 | Miller . |
| 4,542,897 | 9/1985 | Melton et al. . |
| 4,572,509 | 2/1986 | Sitrick . |
| 4,616,829 | 10/1986 | Smack, Sr. et al. . |
| 4,630,817 | 12/1986 | Buckley . |
| 4,637,605 | 1/1987 | Ritchie . |
| 4,708,338 | 11/1987 | Potts . |
| 4,709,917 | 12/1987 | Yang . |
| 4,710,129 | 12/1987 | Newman et al. . |
| 4,711,447 | 12/1987 | Mansfield . |
| 4,720,789 | 1/1988 | Hector et al. . |
| 4,771,394 | 9/1988 | Cavanagh . |
| 4,786,049 | 11/1988 | Lautenschlager . |
| 4,817,938 | 4/1989 | Nakao et al. . |
| 4,817,939 | 4/1989 | Augspurger et al. . |
| 4,860,763 | 8/1989 | Schminke . |
| 4,887,966 | 12/1989 | Gellermann . |
| 4,887,967 | 12/1989 | Letovsky et al. . |
| 4,891,748 | 1/1990 | Mann . |
| 4,919,416 | 4/1990 | DeCloux . |
| 4,925,183 | 5/1990 | Kim . |
| 4,932,651 | 6/1990 | Defaux . |
| 4,938,474 | 7/1990 | Sweeney et al. . |
| 4,938,475 | 7/1990 | Sargeant et al. . |
| 5,031,900 | 7/1991 | Leask . |
| 5,031,901 | 7/1991 | Saarinen . |
| 5,031,902 | 7/1991 | Findlay . |
| 5,033,733 | 7/1991 | Findlay . |
| 5,051,638 | 9/1991 | Pyles . |
| 5,072,929 | 12/1991 | Peterson et al. . |
| 5,076,584 | 12/1991 | Openiano ................................. 482/8 |
| 5,116,294 | 5/1992 | Findlay . |
| 5,135,447 | 8/1992 | Robards, Jr. et al. . |
| 5,180,351 | 1/1993 | Ehrenfried . |
| 5,183,448 | 2/1993 | Wang . |
| 5,207,621 | 5/1993 | Koch et al. . |
| 5,213,555 | 5/1993 | Hood et al. . |
| 5,238,462 | 8/1993 | Cinke et al. . |
| 5,240,417 | 8/1993 | Smithson et al. . |
| 5,242,340 | 9/1993 | Jerome . |
| 5,242,341 | 9/1993 | Yeh . |
| 5,308,296 | 5/1994 | Eckstein . |
| 5,336,141 | 8/1994 | Vittone . |
| 5,336,142 | 8/1994 | Dalebout et al. . |
| 5,336,143 | 8/1994 | Wu . |
| 5,374,227 | 12/1994 | Webb . |
| 5,451,192 | 9/1995 | Hefele . |

OTHER PUBLICATIONS

"DIS and Virtual Reality Networking with VR-Link", Virtual Reality World®, Mar./Apr. 1994, p. 8.

International Search Report for related case PCT/US94/01247, Jun. 16, 1994, 4 pages.

AR.1000 Recumbent Exercise Machine—Nautilus®, brochure, 4 pages.

The Cycling Stimulator by CompuCize, brochure, 4 pages.

INTERACTIVE EXERCISE APPARATUS

CROSS-REFERENCE TO RELATED APPLICATIONS

This is a continuation-in-part of U.S. patent application Ser. No. 08/457,242 filed on Jun. 1, 1995, now U.S. Pat. No. 5, 690,582 which is a continuation-in-part of U.S. patent application Ser. No. 08/189,896 filed on Feb. 1, 1994, now U.S. Pat. No. 5,466,200, which is a continuation-in-part of U.S. patent application Ser. No. 08/012,305 filed on Feb. 2, 1993 which is now abandoned. U.S. patent application Ser. No. 08/012,305 was abandoned in favor of U.S. patent application Ser. No. 08/375,166 filed on Jan. 18, 1995, now U.S. Pat. No. 5,462,503, which is a continuation of abandoned U.S. patent application Ser. No. 08/012,305.

FIELD OF THE INVENTION

This invention relates generally to exercise equipment and more specifically to networkable exercise cycles.

BACKGROUND OF THE INVENTION

It is known that physical fitness is of prime importance to many people. Historically, people have been able to maintain an acceptable level of fitness simply due to their everyday lives. As lifestyles have become progressively more sedentary, people have been forced to seek exercise in other ways.

A portion of society keeps in shape by participating in group exercise events such as tennis, hockey, or basketball games. Such games are forms of "fun exercise" in that participants often take part in such events because they simply enjoy the games or the competition and not solely for the purpose of fitness. However, it is often difficult to coordinate the people and facilities required for many recreational and team sports. Individual sports such as bicycling, running, and swimming are viable alternatives in that they allow for flexible schedules. Some of the disadvantages to these sports are that they are location and weather dependent.

A large segment of society finds it easier and more convenient to go to health clubs or to use home exercise equipment to exercise. Health clubs have extended hours and a wide range of fitness equipment that allows workout schedules to be flexible and workouts to be quick. Current exercise equipment unfortunately makes working out a chore that is tolerated due to the importance of cardiovascular (aerobic) fitness.

Exercise equipment generally falls into two categories: strength and aerobic. Strength equipment includes traditional free weights as well as machines on which the weight is not directly attached to the lifting bars. The user lifts the weights in different ways to strengthen various muscle groups. Aerobic machines improve the user's cardiovascular system and tone muscles rather than building muscles and strength. Aerobic equipment includes exercise cycles, treadmills, and stair climbers. Typically, the required speed or resistance can be varied during a workout. A control panel equipped with a set of light emitting diodes (LEDs) may be provided to depict the routine as a histogram. An average workout lasts approximately 20 minutes. Biomechanical feedback such as calories burned may also be displayed on the control panel.

Most conventional ways of exercising generally are not fun or engaging. A need exists for exercise equipment which makes workouts more enjoyable and fun and which entices more people to exercise.

SUMMARY OF THE INVENTION

An object of the present invention is to provide exercise equipment which makes exercise (e.g., aerobic exercise) less boring and more fun. To accomplish this, the present invention utilizes computer-generated graphics, interactive software, a mechanism for aerobic exercise, steering controls, and a display system to provide exercise equipment which is engaging and fun and which allows competition. The graphics, interactive software, and display engage a user mentally while the exercise and steering mechanisms engage the user physically. As such, a workout with the exercise equipment of the present invention can be as exciting as participating in team sports but with health club or home convenience.

The invention also involves the interconnection of two or more exercise machines via computer networking or, more generally, via any type of analog and/or digital communication system such that the users of the exercise machines can interact with each other as teammates or competitors in a variety of athletic events including basketball games, baseball games, football games, bicycle races, and swimming races. By networking two or more exercise machines, the users of the machines can participate in team sports at home or at the local health club.

In one aspect, the present invention relates to an exercise apparatus comprising an exercise mechanism, a steering mechanism, a control mechanism, a processor or computer, and a display system. During a workout, the user manipulates the exercise mechanism and the steering mechanism to freely navigate through an interactive simulated environment generated by the processor and displayed to the user by the display system. The user manipulates the control mechanism to interact with virtual objects in the simulated environment and to change the view displayed on the display system between an overhead view and a side view. The processor monitors the exercise mechanism, the steering mechanism, and the control mechanism to determine user position and the position of virtual objects in the simulated environment. The processor also controls difficulty of the workout by varying the resistance of the exercise mechanism to simulate characteristics (e.g., topography, terrain, etc.) of the environment. The display is updated by the processor to provide a continuous visual display of the user's position and the position of virtual objects as the user navigates substantially unrestricted through the simulated environment and interacts with virtual objects.

In some embodiments, the exercise mechanism includes pedals and the user sits on a bicycle-type device to achieve exercise by pedaling. In these embodiments, the steering mechanism is a handle located in front of the user or preferably a pair of handles located on either side of the user. The control mechanism may be one or more push buttons located on the steering mechanism. The control mechanism may allow the user to change gears, change the orientation of the view displayed on the display system, or interact with virtual objects. The bicycle-type device on which the user sits in order to exercise preferably tilts and more preferably is capable of moving along any or all of the six degrees of freedom. The movement preferably is related to the user's manipulation of the steering mechanism. The bicycle-type device can have one or more speakers built thereinto or attached thereto. For example, the speaker(s) can be built onto or attached to a seat of the bicycle. In one preferred embodiment, the user pedals while in the recumbent position (i.e., the bicycle-type device is a recumbent bicycle).

A recumbent bicycle provides a number of advantages over an upright bicycle. For instance, for users having different heights, eye location varies less on a recumbent bicycle than on an upright bicycle. This smaller eye-level variation for a recumbent bicycle as compared to an upright bicycle means that, when the display system is one or more viewing screens or monitors placed in front of the user, the recumbent bicycle provides a more comfortable viewing position for a broader user height range for a given monitor and seat position as compared to an upright bicycle. This particular advantage stems from the fact that eye height tracks user height for an upright bike, but it varies with the length of the user's trunk, neck, and head for a recumbent bike, and this latter variation is typically much less (e.g., about half) than the variation in user height. Also, as compared to an upright bike, most people find a recumbent bike easier to mount and dismount as well as generally more comfortable to ride. People who most need exercise to get into shape and/or lose weight typically are less intimidated by, and therefore more likely to ride, a recumbent bike than an upright bike because recumbent bikes do not "expose" such people as much as upright bikes. Another advantage a recumbent bike has over an upright bike is that it is easier for a user to move (e.g., tilt) a recumbent bike because it is lower to the ground and thus has a lower moment of inertia.

Unlike most known bicycle transmission simulators which simulate a real bike transmission or implement a constant-power model in which torque decreases as the rotations per minute of the pedals increases, the invention may involve a transmission model in which the rotations per minute of the pedals is linearly related to the power output of the user. This model enables a user to exert more power by pedaling at a higher cadence, but does not confront the user with an uncomfortably large torque, regardless of the gear selected by the user.

In some other embodiments, the exercise mechanism includes the pedals or steps of a stair climbing exercise machine, and the steering mechanism is a handle (e.g., a T-bar-shaped handle) located in front of the user. The stair climber can be designed to move, and the movement preferably is related to the user's manipulation of the steering mechanism. The movement can include movements along any or all of the six degrees of freedom.

Unlike most known stair climbing simulators which use stairs or pedals that drop towards the ground at a fixed speed (either machine-set or manually adjustable) regardless of the speed at which the user is climbing/exercising, the invention may involve automatic adjustment of the speed of the steps based on the user's climbing/exercising speed. The automatic adjustment is performed in order to keep the user at a particular height or distance above the ground. Some users associate that distance with the quality or effectiveness of the workout. The steps are monitored and controlled to provide the proper resistance to keep the exercising user at one of a plurality of possible user-selectable or computer-set (based upon interactions within the virtual world) heights above the ground. Thus, the user can climb/exercise at any speed he or she desires, and the user's height above the ground is automatically maintained at the user-selected value.

The processor or computer generates the interactive simulated environment and monitors user manipulation of the exercise mechanism and the steering mechanism to determine the user's position within the environment. The processor is configured to allow the user to travel substantially unrestricted throughout the environment by manipulating the exercise and steering mechanisms, to modify his or her course in the environment, and to participate in user-selectable activities within the environment. The processor is capable of running many different programs to provide a variety of simulated environments. Some programs provide roads, terrain, and obstacles for the user and the user's competition. The user can travel across roads and trails or choose to travel across grass, water, or other more challenging terrain. Other programs may provide new worlds for the user to explore or even allow the user to travel across the solar system. Still other programs provide competitive games for the user to play against the computer or other users. Each program provides a simulated environment, and in some preferred embodiments the environment is multi-dimensional (e.g., three-dimensional) to appear more realistic. The user views the simulated environment or world through the display system.

In some preferred embodiments, the processor provides feedback to the user in response to the user's actions within the simulated environment. This includes not only visual feedback via the display system but preferably also sound feedback via the speakers and interactive feedback. Interactive feedback as used herein means modifying the resistance or speed of the exercise mechanism (e.g., the pedals of the bike, the steps of the stair climber, etc.) in response to the user's actions in the simulated environment to simulate collisions and "drafting" situations. Drafting is defined to cover mainly the situations when a user gets behind a moving object (e.g., another user in a networked situation, a computer-generated agent, etc.) and is pulled along to some extent such that the user no longer needs to exert as much energy to maintain the same speed. This may be done in bike riding simulations. Interactive feedback is provided in both networked and non-networked embodiments of the invention. In a networked arrangement, the two or more participants in the simulated world can experience interactive feedback based on interactions in the simulated world with each other or with other objects in the world. An example of interactive feedback is when a user collides with an obstacle or a competitor in the simulated environment and "crashes" as a result, and the processor then causes visual and audio feedback to the user (e.g., showing the wreck on the display system and causing a corresponding crashing sound to be projected by the speakers) as well as causing the pedals to chatter, stiffen, and/or lock-up or loosen. Collisions between objects can either accelerate or decelerate the objects in the simulated environment. In a head-on collision or a collision with a stationary object, the user would be decelerated and as a bike would feel the pedal resistance increase. However, if the user is hit from the rear by another object, he would accelerate and feel a decrease in pedal resistance.

The processor, in some preferred embodiments, provides "tour guides" or "computer-generated agents" in the simulated environment. These entities react to the user's position and movement within the virtual world. They can, for example, lead the user along a particular route within the simulated environment and adjust speed to maintain a small lead on the user thereby providing the user with a target to chase or follow. The processor determines the user's actions in the environment and causes the agents to react to these actions. This can help to motivate the user to exercise harder and to explore areas of the simulated environment that the user might not otherwise encounter. In general, the agents do not force the user to take certain actions within the environment but instead entice the user to take certain actions.

The display system can be spaced from the user. For example, in some embodiments it is a viewing screen or monitor located in front of the user or a plurality of monitors located in front of and/or partially or completely around the user. Alternatively, the display system can be located closer or attached to the user. For example, in some embodiments the display system is a head-mounted device worn by the user.

In another aspect of the invention, the exercise apparatus is networkable with one or more other such exercise apparatus. When two or more of these exercise apparatus are interconnected, they can communicate and exchange information to allow the users to engage in simulated sporting events as teammates or competitors.

Another object of the invention is to simultaneously display the results of a predetermined event caused by one exercise apparatus on the display system of each exercise apparatus in the network. For example, if two or more users are playing a ball game on a network of exercise apparatus, each user would view the ball being shot at the same time. To accomplish the simultaneous display of events, each predetermined event has an associated time delay which must elapse before the results of the event are displayed. The delays allow time for a time-stamped event notification message to travel around the network so that all users view the results of the event at the same time.

The invention also involves synchronization between networked exercise apparatus. Each apparatus stores a transmission time factor. The transmission time factor represents the amount of time data takes to travel from one exercise apparatus to other exercise apparatus in the network. Each time an exercise apparatus transmits data, the apparatus also transmits a timestamp indicating when the data was sent. The receiving exercise apparatus calculate the amount of time the data spent traveling through the network. Each receiving apparatus updates its stored transmission time factor only if the calculated travel time of the data is less than the stored transmission time.

Other objects, aspects, features, and advantages of the invention will become apparent from the following description and from the claims.

BRIEF DESCRIPTIONS OF THE DRAWINGS

In the drawings, like reference characters generally refer to the same parts throughout the different views. Also, the drawings are not necessarily to scale, emphasis instead being placed on illustrating the principles of the invention.

DETAILED DESCRIPTION OF THE INVENTION

The present invention is generally directed to interactive exercise equipment which engages a user's mind and body. The equipment enables a user to play a competitive game against another user or a computer-generated adversary. The equipment can be provided in the form of, for example, a "virtual bicycle" or a "virtual stair climber". Each of these two embodiments of the invention are discussed in detail below.

Figure 1:
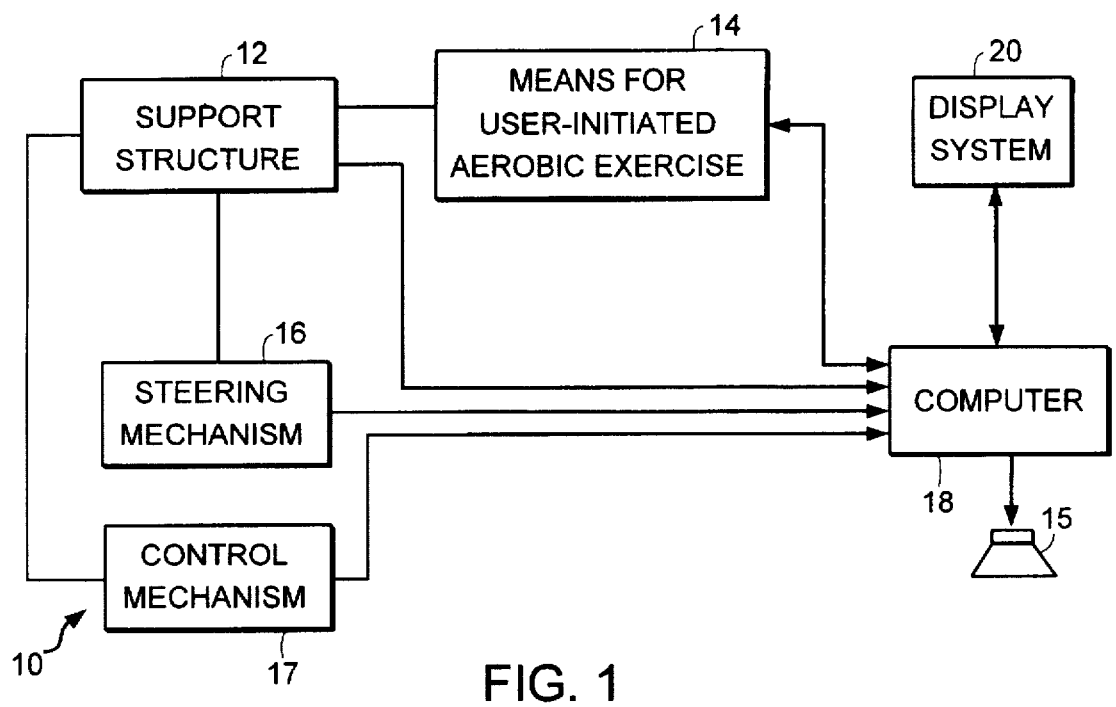
FIG. 1 is a block diagram of an interactive exercise apparatus illustrating the principles of the present invention.

Referring to FIG. 1, an exercise device 10 comprises a support structure 12 for supporting a user. The support structure 12 may include a bicycle seat or bucket seat. An exercise mechanism 14 for providing aerobic exercise to a user, such as cycling pedals, is disposed proximate the support structure 12. A steering mechanism 16, such as handles or handlebars, is also positioned near the support structure 12.

An interactive simulated environment is generated by a processor 18, such as a computer, and displayed on a display system 20. The display system comprises a viewing screen or multiple viewing screens to provide a wider field of view. Alternatively, the display system is a head-mounted display device 21 having a helmet portion 17, a viewing screen portion 19, and a cable for coupling to the computer, as shown in FIG. 2C. One or more speakers 15 are coupled to the computer 18 for broadcasting sounds such as sounds corresponding to the simulated environment and/or the user's actions within the environment.

A control mechanism 17 which the user manipulates to change the orientation of the view displayed on the display system or to interact with virtual objects within the simulated environment is also located near the support structure 12. The control mechanism 17 may include push buttons for selecting different activities. One push button may allow the user to change the view displayed on the display system 20 between an overhead view and a side view. Another push button may allow the user to apply a force to a virtual object in the simulated environment.

The user manipulates the exercise mechanism 14, the steering mechanism 16 and/or the control mechanism 17 to travel substantially unrestricted throughout the environment and to interact with virtual objects displayed on the display. To accomplish this, the processor 18 monitors the exercise mechanism 14 and the steering mechanism 16 to determine user position in the simulated environment. The processor 18 controls the level of difficulty of the exercise mechanism 14 to simulate characteristics (e.g., topography, terrain, etc.) of the environment. The display 20 is periodically updated by the computer 18 to provide a continuous visual display of the user's position as the user travels substantially unrestricted in the simulated environment.

Figure 2A:
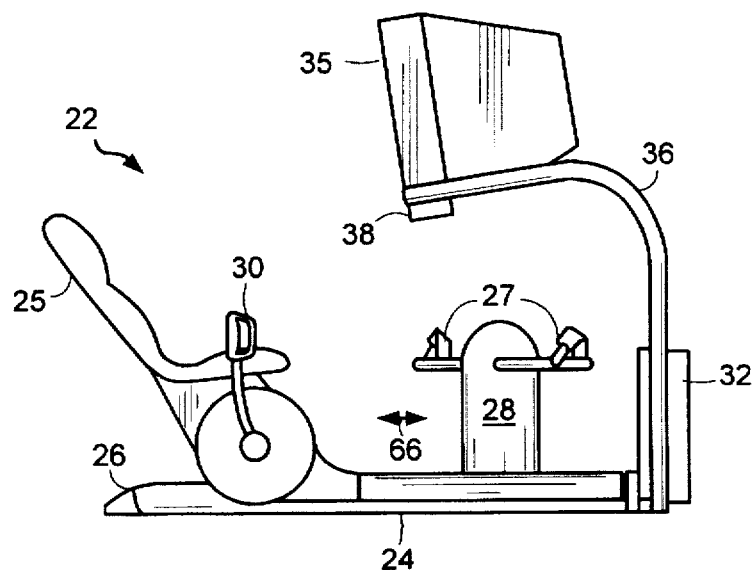
FIG. 2A is a side view of an interactive exercise cycle of the present invention.

In one embodiment, the invention is directed to an exercise cycling apparatus as shown in FIG. 2A. The apparatus 22 includes a frame 24 movably mounted to a stationary base 26. A bucket seat 25 is mounted to the frame 24. The seat 25 enables a user to be seated in the recumbent position which provides several biomechanical and aerobic advantages. Recumbent cycling has many advantages, some of which are listed above in the Summary of the Invention section. Recumbent cycling engages the gluteus maximus, the largest muscle group, to provide for maximum aerobic activity before reaching the anaerobic threshold. The bucket seat 25 makes the recumbent position very comfortable for long rides. In addition, the recumbent position is less intimidating to overweight users. The present invention, however, can employ the more common upright exercise bicycle frame and seat without departing from the scope of the invention.

A pair of cycling pedals 27 extend from a pedal resistance device 28. The pedal resistance device 28 is adjustable so that the pedals 27 can always be within reach of a short or long-legged user. A user exercises by manipulating the pedals 27. Two vertically oriented handles 30 are coupled by a mechanical linkage 72 (see FIG. 5A) to the frame 24 for steering the cycle 22. The handles 30 are positioned so that one handle is located on each side the seat 25. As the user manipulates the handles 30, the mechanical linkage cause tilting of the frame 24 relative to the base 26. This feature simulates the turning action of a bicycle and is explained in detail below.

A computer 32 capable of generating an interactive simulated environment is mounted to an L-shaped leg 36 which extends from the stationary base 26. The computer 32 can be powered by many different types of microprocessors. One embodiment of the invention includes a personal computer based on the Intel 486 microprocessor. Other computers, such as those based on the Motorola 68040 processor can be used. Regardless of the type of microprocessor employed, the computer 32 typically also includes one or more electronic storage devices for storing one or more databases which describe the simulated environment(s). The storage devices can include CD-ROMs, hard disk drives, floppy disk drives, read only memories (ROMs), or random access memories (RAMs). At run time, the microprocessor reads the appropriate data from the database and constructs the desired simulated environment.

A viewing screen, such as a television monitor 35, is positioned opposite the seat 25 and oriented to be viewed by a seated user. The monitor 35 may be capable of showing computer generated graphics as well as standard TV and VCR images. The monitor 35 is connected to the computer 32 to provide a visual (and optional audio) display of the simulated environment. While the monitor 35 can be any size, a larger monitor is preferred. A variable speed fan 38 is mounted adjacent to the monitor 35. The computer 32 regulates the speed of the fan 38 to provide an air flow which simulates wind speed. The speaker(s) 15 can be located in the monitor 35 or, more preferably, attached to the seat 25 (FIG. 2B).

Figure 2B:
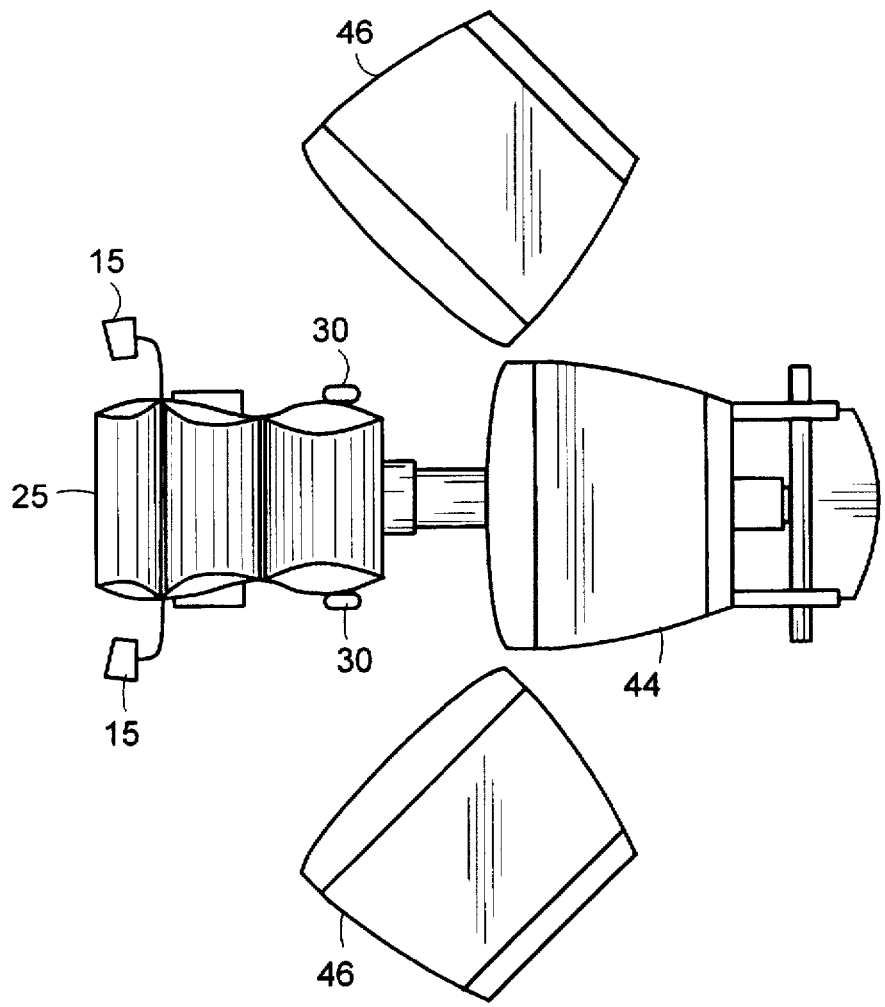
FIG. 2B is a top view of an alternative interactive exercise cycle which includes a plurality of visual display units.
Figure 2C:
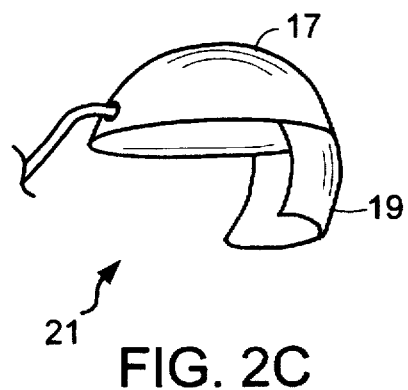
FIG. 2C is a perspective view of one embodiment of a head-mounted display to be worn by a user of an interactive exercise apparatus according to the invention.

Referring to FIG. 2B, a central viewing monitor 44 and two side monitors 46 can be employed. The two side monitors 46 provide peripheral vision which enhances the user's sense of motion. The side monitors may also be employed for biomechanical data and/or status displays.

Referring again to FIG. 2A, a user operates the apparatus 22 by pedaling the cycling pedals 27 and steering with the handles 30 to freely navigate through the simulated environment. The computer 32 can vary the pedal resistance felt by the user by controlling the pedal resistance device 28. A method for calculating the pedal resistance to be applied to the user is described in more detail below in the discussion of FIGS. 21, 22A and 22B. The computer 32 monitors pedal speed, steering direction and interaction with virtual objects to determine the user's position and the position of virtual objects in the simulated environment. Based on the user's action, the computer 32 provides the monitor 35 with updated views of the simulated environment which corresponds to the user's position and the position of the virtual objects. The monitor 35 provides the user with an ongoing visual display of the simulated environment based on the user's position therein as the user freely navigates in the environment.

The computer 32 is capable of running many different interactive programs to provide a variety of environments. Some programs provide roads, terrain, and obstacles for the user. Other programs include underwater adventure, pedal powered flight simulators, and space travel. Still other programs include competitive games which can be played against computer-generated players or against other users. A competitive game program is described in more detail below in the discussion of FIGS. 17A–17C, 18 and 19. Each program provides a simulated environment which the user views through the monitor 35. The user freely navigates in the environment using the pedals 27 and the steering handles 30. In other words, user travel in the simulated environment is substantially unrestricted. Thus, the user can travel across roads and trails or chose to travel across grass and water as well as other more challenging terrain.

To satisfy a wide range of exercisers and to make for broad range of experiences the preferred simulated environments contain a plurality of activities which the user may spontaneously select as they tour the environment. For example, in a simulated Caribbean island, the users can follow one or more tour guides around the island, they can enter a road rally with computer-generated competitors, they can plunge into the water and chase fish, or even search for the mysterious white whale. Other events include jumping from cliffs, and running jeeps off the road.

Regardless of whether the invention is provided in the form of a virtual bike or a virtual stair climbing simulator, in some preferred embodiments of the invention, the computer provides feedback to the user in response to the user's actions within the simulated environment. This includes not only visual feedback via the display system but preferably also sound feedback via the speaker(s) and interactive feedback (as defined previously). Interactive feedback is accomplished by the computer interrupting the exercise mechanism (e.g., the pedals of the bike, the steps of the stair climber, etc.) as a result of collisions or drafting in the simulated world. For example, if the user collides with an obstacle or a competitor in the simulated environment and "crashes" as a result, the computer causes visual and audio feedback to the user (e.g., showing the wreck on the display system and causing a corresponding crashing sound to be projected by the speakers) as well as causing the pedals to chatter, stiffen, and/or lock-up or loosen.

Also, the processor, in some preferred embodiments, provides "tour guides" or "computer-generated agents" in the simulated environment. These entities react to the user's position and movement within the virtual world. They can, for example, lead the user along a particular route within the simulated environment and adjust speed to maintain a small lead on the user thereby providing the user with a target to chase or follow. The processor determines the user's actions in the environment and causes the agents to react to these actions. These agents elicit exercise from the user, and motivate the user to exercise harder and explore areas of the simulated environment that the user might not otherwise encounter. In general, the agents do not force the user to take certain actions within the environment but instead entice the user to take certain actions. Further details of these entities are provided below.

One or more of the computer-generated agents or entities can be moving about in the environment at any given time. In a cycling environment, these entities or actors may be depicted as other cyclists, cars, trucks, or even animals. The motion and behavior of the actors is consistent with the user's expectations. For example, trucks drive on roads, bikes can follow paths or go cross country but cannot fly. These actors generally obey the physical laws of the particular simulation in which they exist, react to the user's actions in the environment, and motivate the user to exercise harder. Another example is a delivery truck entity which is programmed to avoid hitting objects especially people such as cyclists. This can be fun for the user as he or she crosses the path of the truck and then watches as the truck attempts to avoid a collision by swerving out of the way. If the truck is unable to avoid a collision with the cyclist, the user will feel a jolt in the pedals (the interactive feedback) during the collision with the truck. Interactions with the truck motivate the user to pedal fast to catch the truck and get in its way.

In a networked simulation (networking is described below), the motions of these actors can be communicated across the network. In this manner, two real exercisers who are sharing a virtual environment can interact with the same actors. For example, two virtual bikes could leave the truck driver no option but to swerve off the road into a lake. While this is not something that cyclists would do in the real world, it can be a humorous and entertaining event in a virtual world.

Many existing exercise machines and video games have a start-up sequence which requires a user to enter certain facts, such as weight, skill level, desired course and length of workout. The information is usually gathered through a set of buttons with LED indicators. However, this type of interrogation can be confusing and time-consuming. Accordingly, the cycling apparatus 22 (as well as the stair climbing simulator described below) may gather some of this type of information indirectly. For example, a sensing device (69 in FIG. 5A) can be incorporated into the seat 25 for automatically weighing a user. Other information may be gathered by means of the user navigating down the path of choice. For example, a person who desires a tough workout could head for a hilly path, and this choice would be an input to the computer regarding the type of workout desired by the user. Other choices may be made be responding to various road signs or other markers in the simulated environment. By using this navigational metaphor, the user is able to make choices in a natural and intuitive manner. If the user misses a choice he or she can simply turn around. A user exercising with a stair climbing simulator according to the invention can enter, for example, a desired above-ground distance in this intuitive manner. In general, any information about the user and/or the type of workout desired by the user can be automatically gathered in this manner which does not require the user to be directly asked or to directly answer any questions.

The computer 32 may be adapted to participate in a communication network connecting several exercise devices. As such, multiple users can exercise in the same simulated environment. This feature stimulates impromptu races, games and competition among users. By allowing users to navigate freely around the same environment, they can engage in friendly touring or fierce competition on a spur of the moment basis. This network feature is described in more detail below with reference to FIGS. 7–13.

Figure 3:
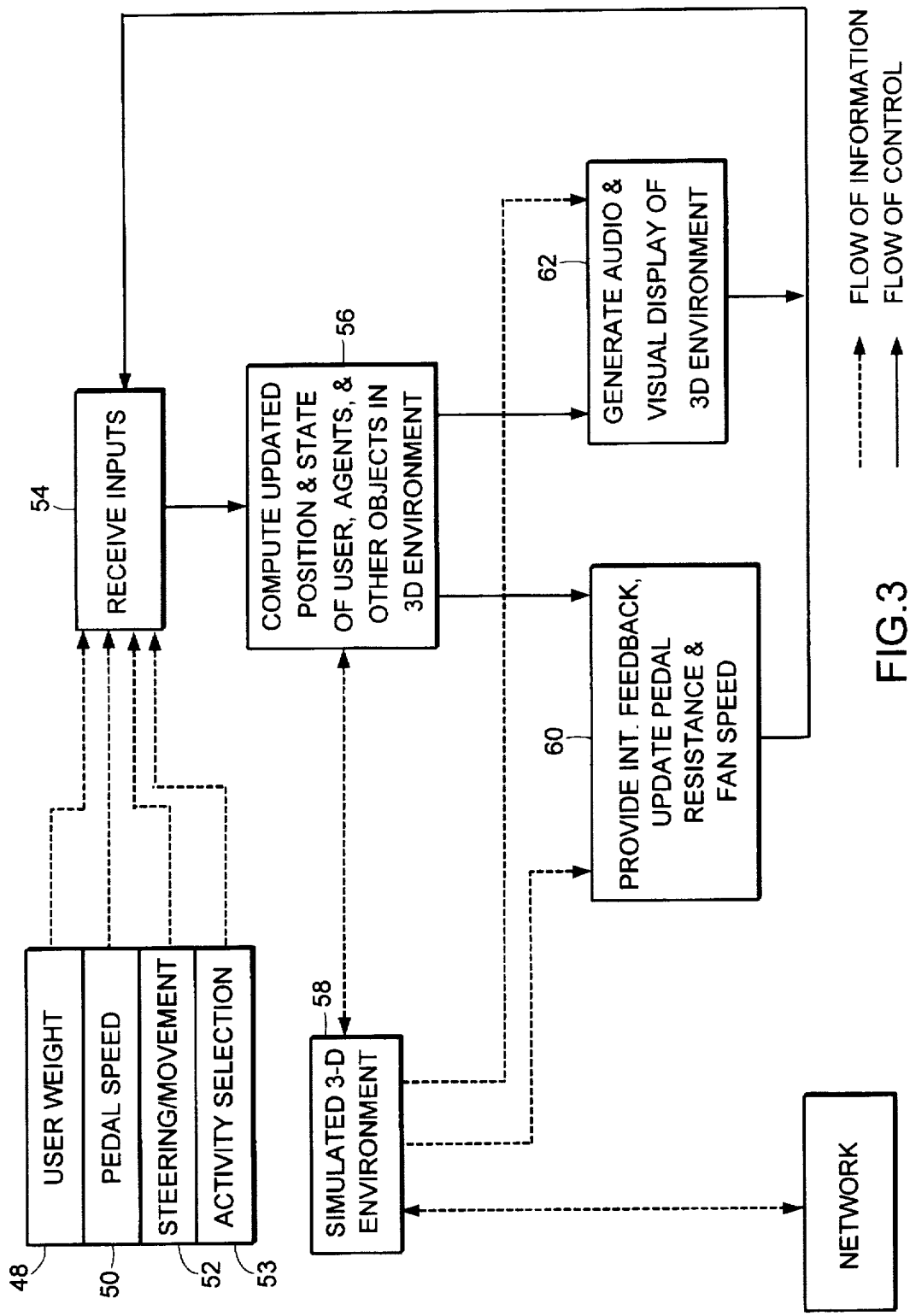
FIG. 3 is a flow chart illustrating one process for determining a user's position as the user freely navigates through a simulated environment.

A general process flow sequence of the interactive software within the computer 32 is shown in FIG. 3. Once a particular environment has been selected, the computer monitors a variety of parameters including user weight 48, pedal speed 50, steering/movement 52, and activity selection 53 (step 54). The user activity selection parameter includes user selected interactions with virtual objects in the simulated environment. For example, the user may select to apply a force to a virtual object in the simulated environment. The computer uses these parameters to update the user's position and direction in the environment (step 56). The computer also updates the position and direction of virtual objects in the simulated environment. The computer preferably also updates the position and actions of the agents working in the simulated environment, which position and actions preferably depend upon the user's activity. Subsequently, the computer generates a visual (and optionally audio) image of the environment based on the updated positions of the user and virtual objects (step 62). The computer preferably also provides the agents described previously. The monitor 35 displays updated images at least 7 times/second. The computer 32 updates pedal resistance to simulate such elements as hills, gear changes, road surfaces, simulated headwinds, and drafting of opponents (step 60). The computer preferably also provides the interactive feedback described previously. The fan speed can be modulated to correspond to the simulated windspeed and speed of travel. Finally, the computer 32 may also generate general sounds such as background music. One or more speakers for projecting the sound can be located in/on the computer, in/on the display (s), or elsewhere in/on the exercise machine (e.g., in/on the seat near the user's head). (FIG. 2B shows two speakers attached to the recumbent seat 25, and a microphone and a speaker are shown and described below with reference to FIG. 10.)

Figure 4:
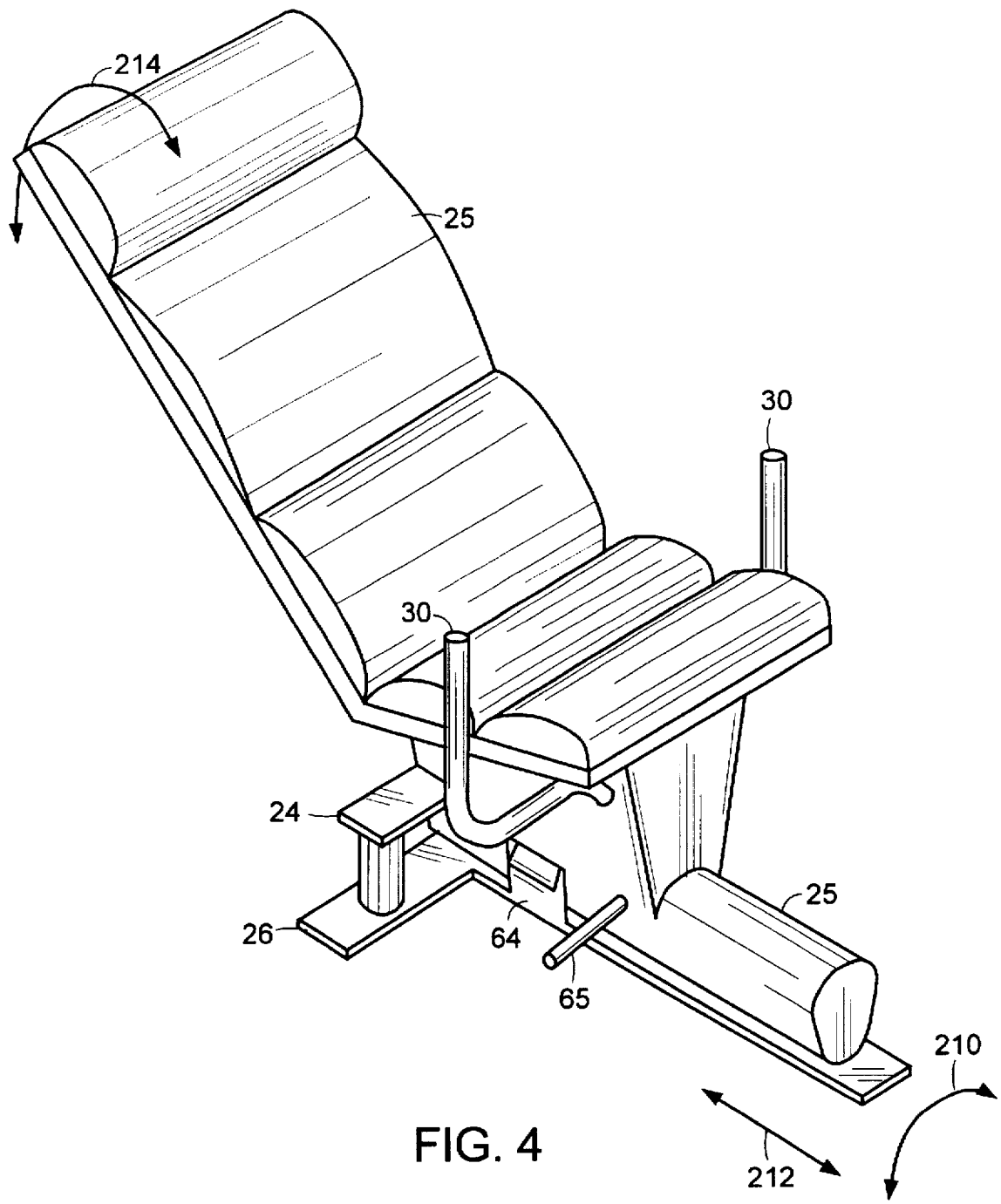
FIG. 4 is a partial perspective view of the interactive exercise cycle of FIG. 2A illustrating a frame movably mounted on a stationary base.

A detailed illustration of the seating portion of the exercise apparatus 22 is provided in FIG. 4. The seat 25 upon which the user sits is mounted onto the frame 24. The frame 24 is movably mounted to the stationary base 26 by hinges 64. Although only one hinge 64 is shown, it is noted that one or more hinges are used. Push button controls can be provided on the handles 30 for shifting gears and other interactive functions. These buttons preferably are at the end of the handles 30 such that they can be depressed with the user's thumbs. The buttons are covered by one-piece elastomeric hand grips which protect the buttons from the user's sweat. A handle 65 preferably is provided which is easily reachable by the user sitting in the seat 25. The handle 65 is used to adjust for the height of the user. If the user needs to adjust the system to fit his height, the user manipulates the handle to release the pedal mechanism 27/28 (FIG. 2A) and then moves the pedals away or towards him or her (as indicated by an arrow 66 in FIG. 2A) to the desired position. The seat 25 preferably is in a fixed position, and it is the pedals which are adjusted back or forth to suit the user.

Figure 5A:
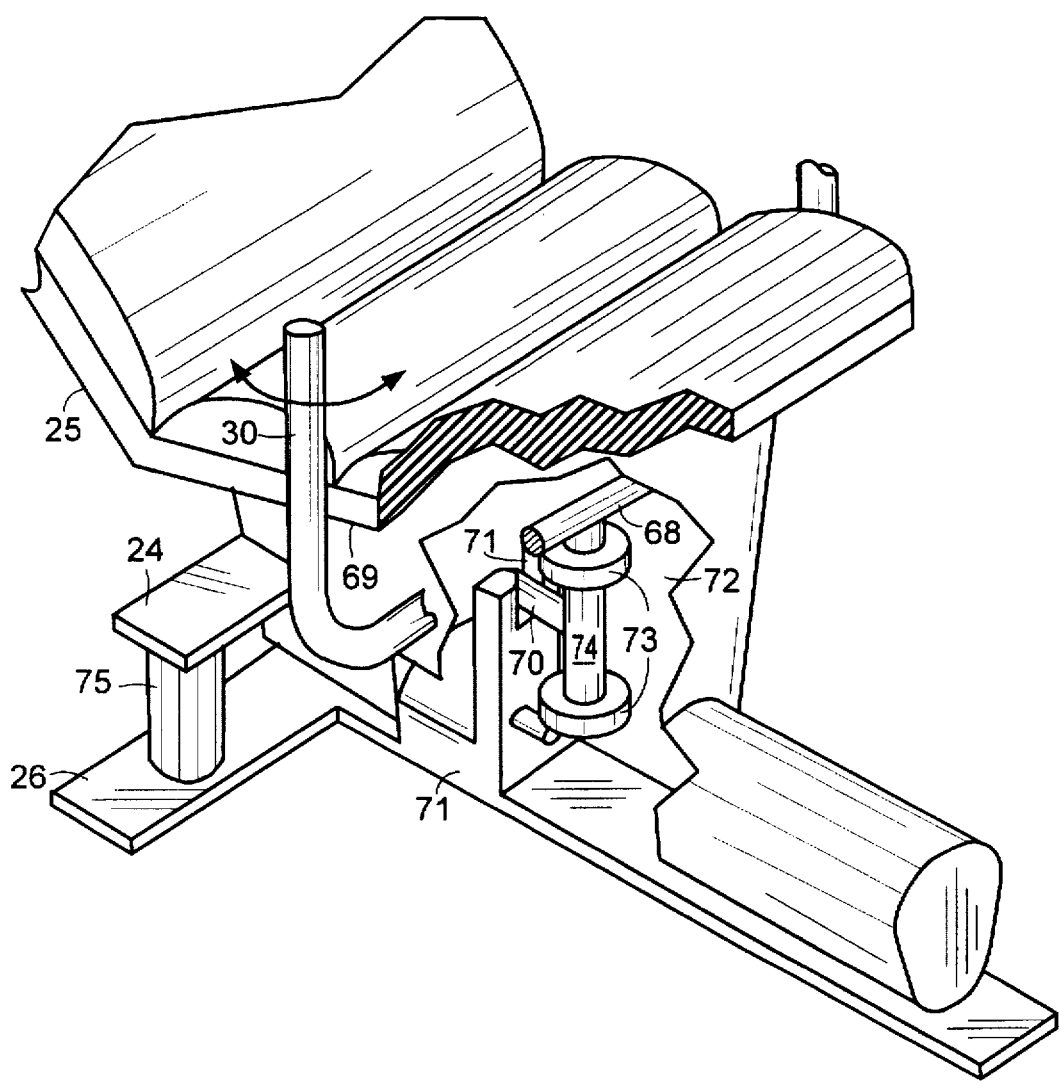
FIG. 5A is an exploded partially cut-away view of FIG. 4 illustrating a mechanical linkage connecting the steering mechanism to the base.

Referring to FIG. 5A, a mechanical linkage 72 allows the frame 24 to tilt relative to the base (e.g., up to 15 degrees or more to either side of the longitudinal vertical plane) in response to manipulation of the handles 30 for simulating the turning action of a bicycle. The handles 30 are connected to the mechanical linkage 72 by a beam 68. The mechanical linkage 72 includes a horizontal beam 70 positioned between a pair of vertical posts 71. The posts 71 extend from the stationary base 26. The mechanical linkage also includes bearings 73 mounted in the frame 24 and holding a pivoting vertical post 74.

As the user manipulates the handles 30 back and forth (as indicated by the arrows) to steer in the simulated environment, the beam 68 turns causing the vertical and horizontal posts (74, 70) to move in the same direction laterally. The horizontal post 70 contacts the vertical post 71 which pushes the frame 24 in the opposite direction. This causes frame 24 to tilt about the hinge 64 causing the seat 25 and the pedals 27 to tilt accordingly.

A pair of springs 75 are positioned on opposite sides of the seat 25. The springs 75 are disposed between the frame 24 and the base 26 for centering the frame 24 once the user lets up on the handles 30 or gets off the seat 25. As such, the springs 75 serve as a self-centering mechanism to ensure that the seat 25 is vertically aligned for easy mounting and dismounting.

A sensing device 69 located under the seat 25 measures the user's weight and adjusts the stiffness of the self-centering springs 75. The springs 75 are adjusted to stiffer settings for heavier persons and less stiff settings for lighter persons. As such, each user can experience the full range of tilting motion.

Additional sensors may be employed in and around the seat 25 to non-invasively monitor, for example, the user's heart rate, pedal speed, and power output. For example, the sensing device 69 provides an estimate of the user's body weight. These inputs are used by the computer software to determine the caloric output of the user.

Figure 5B:
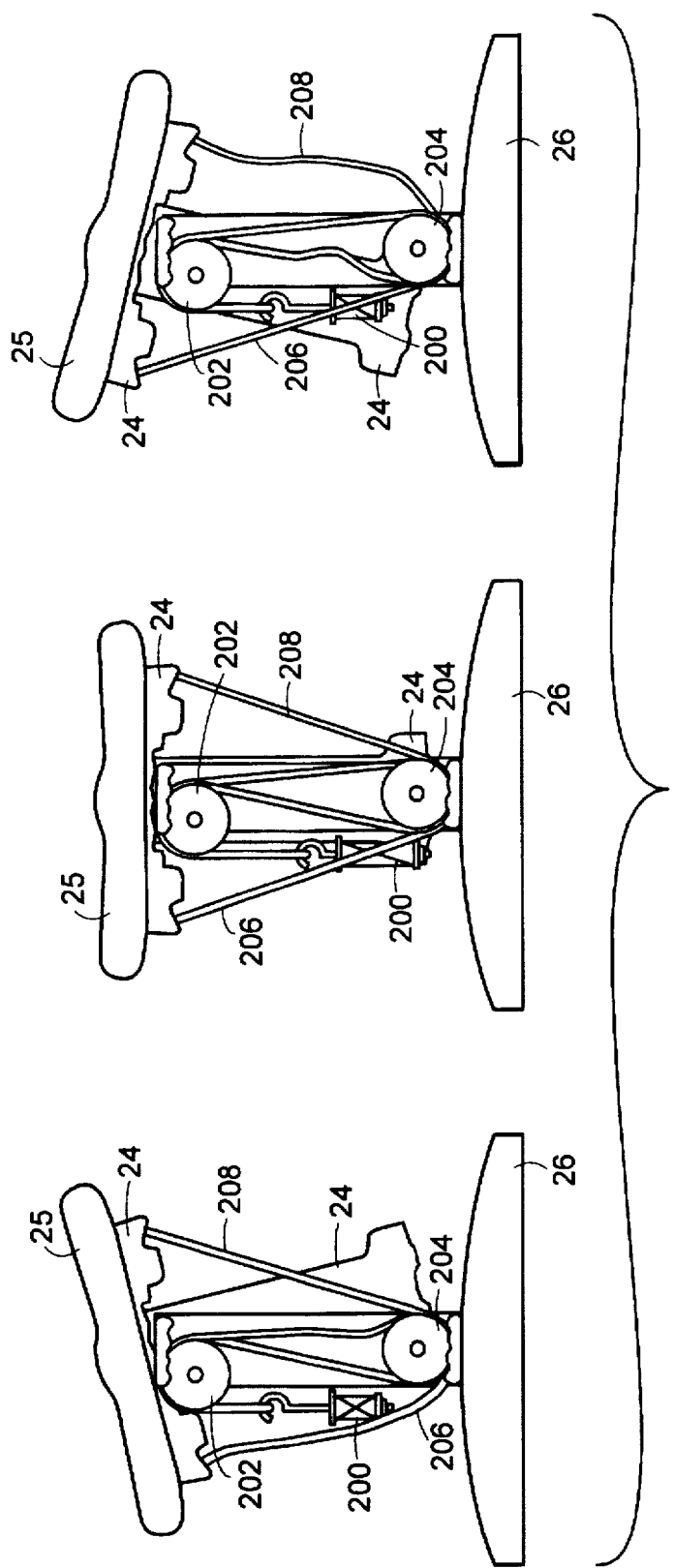
FIG. 5B is a diagram of a single spring mechanical tilting arrangement showing the seat in a tilted-eft position, a center position, and a tilted-right position.

Referring to FIG. 5B, in an alternative embodiment to that shown in FIG. 5A, tilting is accomplished with a different mechanical set-up. This alternative arrangement utilizes only one spring 200. The frame 24 and the seat 25 move together relative to the stationary base 26 in response to manipulation of the handles 30 for simulating the turning action of a bicycle. The handles 30 are not shown in FIG. 5B for simplicity and clarity. This mechanical arrangement includes two pulleys 202, 204 and two cables 206, 208 coupled to the spring 200. With the seat in the un-tilted center position, both cables have approximately equal tension. As the user manipulates the handles 30 back and forth to steer in the simulated environment, the seat and the frame tilt together and one of the two cables is pulled such that it compresses the spring 200 while the other cable goes loose. For example, in tilting to the right, cable 206 pulls up on a hook which compresses the spring 200, and in tilting left, cable 208 pulls up on the hook compressing the spring 200. The spring 200 is pre-loaded to pull down on the hook and bring the seat/frame to the center position once the user lets up on the handles or gets off of the seat. Thus, this alternative embodiment also has a self-centering mechanism to ensure that the seat is vertically aligned for easy mounting and dismounting. As with the embodiment of FIG. 5A, the frame, seat, and pedals tilt together with this single spring arrangement of FIG. 5B. Also, a sensing device can be located under the seat to measure the user's weight and adjust the stiffness of the self-centering spring 200. The spring 200 is adjusted to stiffer settings for heavier persons and less stiff settings for lighter persons. As such, each user can experience the full range of tilting motion as with the embodiment of FIG. 5A. Additional sensors may be employed in and around the seat to monitor non-invasively, for example, the user's heart rate, pedal speed, and power output. These inputs can be used by the computer to determine, for example, the caloric output of the user.

Referring back to FIG. 4, the seat, frame, and pedals of a virtual bike according to the invention can, in response to the user's manipulations of the handles, move at least in a side-to-side tilting action as described above and as indicated by an arrow 210 in FIG. 4. Movement of the seat, frame, and pedals also preferably is allowed via manipulation of the handles in the straight-back and straight-forward directions indicated by an arrow 212 and in the tilting back and forth directions as indicated by an arrow 214. Thus, user manipulation of the handles causes movement of the seat and the pedals preferably in any of six degrees of freedom.

The apparatus of the present invention can employ a traditional freewheel and flywheel to provide pedaling resistance. However, a closed loop digital control system may be employed instead. As such, pedaling resistance would be provided by a simpler drive mechanism controlled electronically by a digital control system to provide for smooth pedaling strokes.

Figure 6:
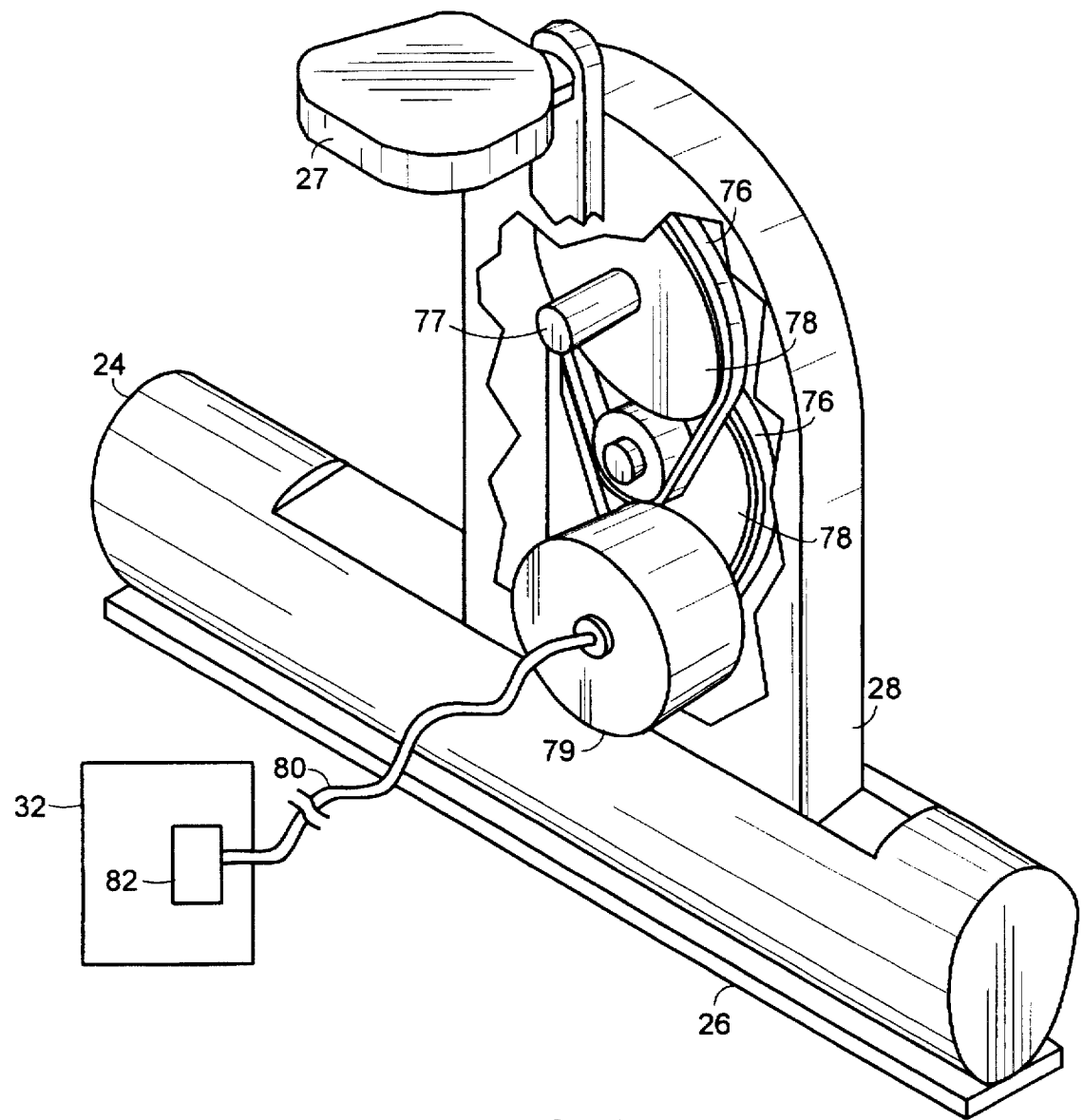
FIG. 6 is a cross-section view of a pedal resistance device used in the interactive exercise cycle of FIG. 2A.

Referring to FIG. 6, the cycling pedals 27 are connected to the pedal resistance device 28. The device 28 is adjustable (via the handle 65 of FIG. 4) to accommodate users having short and long legs. The pedals 27 turn an axle 77. The axle 77 is coupled to a braking device 79 by a plurality of belts 76 and pulleys 78. The braking device 79 can include any of the following mechanisms: a magnetic particle brake, hysteresis brake, mechanical straps and pads, electrical generators, torque motors or magnetic inductance. In one embodiment, a hysteresis brake is used (such as Model HB produced by Magtrol, Inc. of Buffalo, N.Y.) providing a small simple means of providing the resistance to the pedals.

The digital control system 82 is connected to the brake 79 by wires 80. Responsive to the interactive software in the computer 32, the control system 82 controls the pedal resistance of the braking device 79 electronically, thereby emulating the traditional flywheel/freewheel arrangement to provide the proper combination of pedal resistance and inertia for smooth pedaling revolutions. For example, an extremely light resistance is provided to simulate downhill travel and higher resistance is provided to simulate gear changes, wind resistance, and hills. The pedals can be driven backwards to reverse direction. A method for determining the pedal resistance to be applied by the pedal resistance device 28 is described in more detail below in the discussion of FIGS. 21, 22A and 22B.

As mentioned previously with reference to FIG. 3, the computer (18 in FIG. 1, 32 in FIG. 2A) can be interconnected with computers of one or more other exercise apparatus via a network interface module. With two or more of these exercise apparatus networked together, the computers can communicate and share information and allow the users to navigate freely in the same simulated environment and to interact as teammates or competitors.

Figure 7:
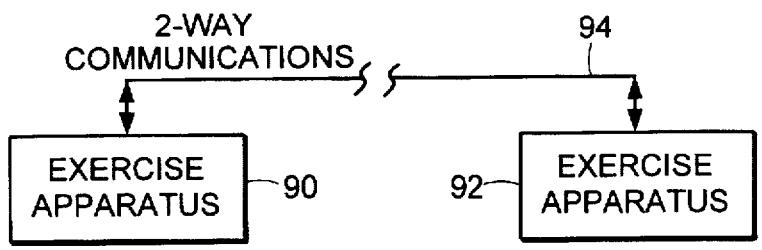
FIG. 7 is a block diagram of an exercise apparatus-to-exercise apparatus network according to the invention.

Referring to FIG. 7, a computer of a first exercise apparatus 90 is interconnected to a computer of a second exercise apparatus 92 via a two-way communication link 94. While only two exercise apparatus are shown in FIG. 7, it is possible to network more than two such machines together via the link 94. Note that while each exercise apparatus 90, 92 can be a device in accordance with the previous description which references FIGS. 1-6, each also can be any other type of exercise machine which: (i) allows a user to exercise some part of her (or his) body; (ii) allows a user to indicate a desired direction of motion (i.e., steer); and (iii) includes a computer or processor to allow interconnection and communication with other such exercise machines. For example, each exercise apparatus can be a stair climbing simulator which is described below. Also, one networked apparatus can be a virtual bike while another can be a virtual stair climber. In one embodiment, one (or more) of the networked exercise machines is a stair climber machine having a pipe or handle which the user pushes and/or pulls (e.g., with his or her hands) in various directions to indicate various desired directions of motion, the machine having one or more transducers attached to the handle such that the user's manipulations of the handle are converted into signals the machine's computer can understand and/or process.

Computer-generated agents and other moving objects can also be shared across the network so that behavior of the agents in the simulated environment is consistent on all of the networked exercise apparatus. For example, two exercisers could be chasing the same whale in an underwater adventure and the whale would react to both users in a consistent fashion. The modeling of the networked agents can be accomplished using methods known as distributed simulation technology. This technology was originally developed for use in military simulators such as the SIMNET system. One implementation of distributed simulation technology assigns one of the networked machines as the "master" for a particular agent and other machines are designated as "ghosts". Each machine updates the actions of its agent (master or ghost) according to the program and interactions with various users. Periodically, typically once every few seconds, the master program transmits an information packet over the network to synchronize the state of the ghost agents. In between synchronization events, both the master and ghosts are responding to similar inputs and therefore their behaviors tend to be similar over that short time span. The periodic synchronization packets keep the state of the agents on different machines from diverging over time. This method accomplishes the goal of keeping the behavior of the agents similar across the network with a minimum of communication. Other methods for distributed simulation could also be employed.

The link 94 can be any type of two-way transmission channel such as telephone lines (analog and/or digital) or direct-connecting cables. The link 94 also can be free space in the case of communication by electromagnetic wave transmission and reception. The physical distance between the first and second exercise apparatus 90, 92 can be a factor in determining the type of channel to employ for the link 94. For instance, if the two apparatus 90, 92 are located physically near each other (e.g., in the same building), the link 94 can be a coaxial or electrical cable. As another example, if the two apparatus 90, 92 are located physically away from each other (e.g., in different cities but in the same state), the link 94 can be established by telephone lines. The link 94 also can, in some embodiments, represent generally a computer network (e.g., a token ring network, an Ethernet network, etc.) on which two or more exercise apparatus exchange information.

Regardless of the physical distance between the two (or more) networked exercise apparatus, the network connection allows the users to exercise in the same simulated environment. The computer in each exercise apparatus (not shown in FIG. 7) controls the communications between apparatus. The computers exchange various parameters (such as user weight 48, pedal speed 50, steering/movement 52, and activity selection 53 as indicated in FIG. 3) so that each computer can display to its user the position and direction of the other users in the environment. In general, the communications between the networked computers allow each user to interact with the other users.

In the simulated environment, each user can be depicted with a unique (three-dimensional) icon, picture, or other symbol. During the simulation, the same environment database is stored and executed on each machine. Each computer is responsible for updating the environment so that its user sees herself (or himself) in relation to all other networked users. The desired simulation typically is selected by agreement of all interested users on the network prior to the start of the group simulation. After selection, that environment's database is transferred between computers (over the link 94) so that each computer can execute the same environment and participate in the group simulation. Typically, each computer has a permanent copy of the selected simulation environment stored therein and thus does not need to receive it over the link 94. Mechanisms to allow networked users to join an already-begun group simulation can be provided.

Figure 10:
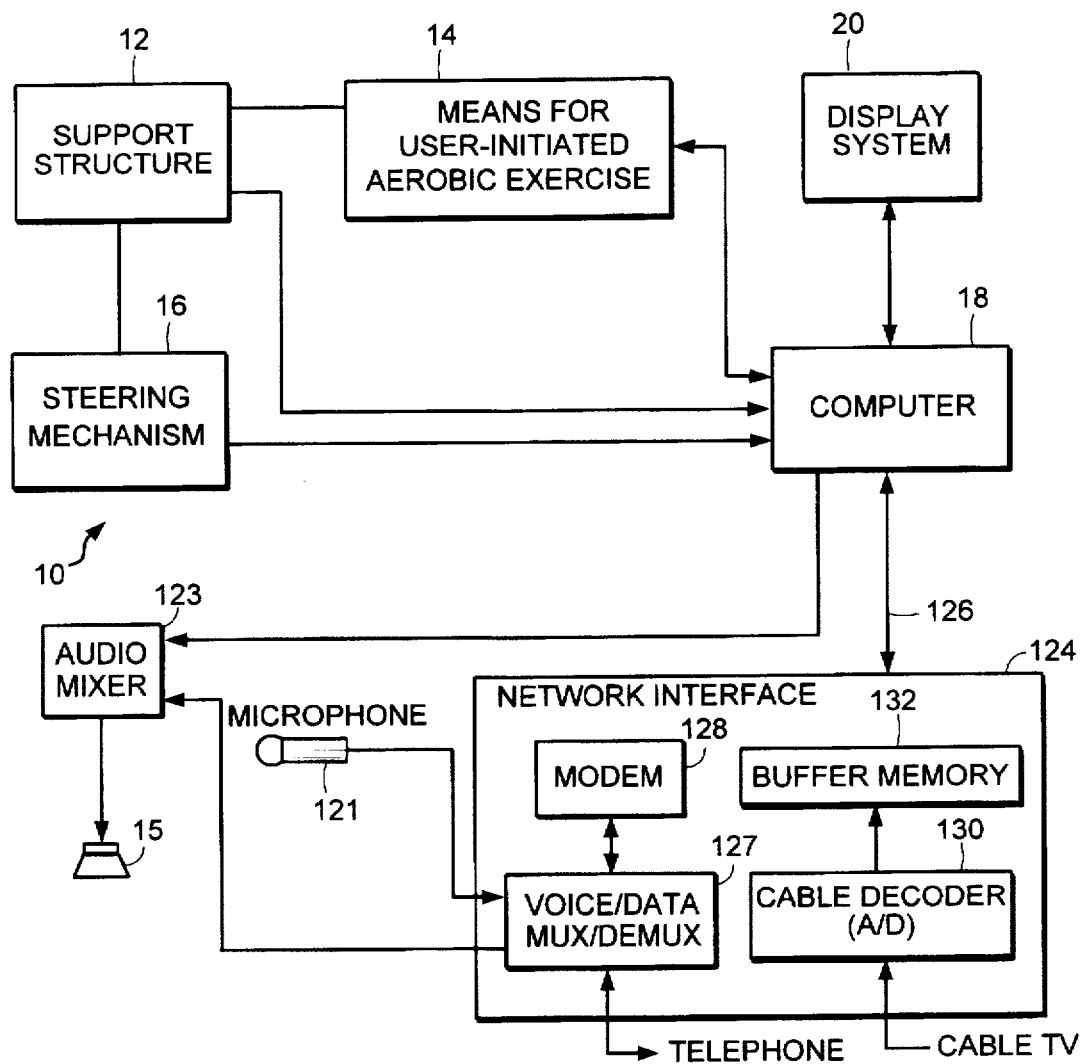
FIG. 10 is a block diagram of the interactive exercise apparatus of FIG. 1 with a network interface.

In addition to sharing position, direction, etc. parameters, the networked computers can share voice information. While a microphone is not shown in FIG. 7, it should be understood that a microphone can be electrically coupled to the computer and located in/on the computer, in/on the display(s), or elsewhere in/on the exercise machine (e.g., in/on the seat near the user's head). (A microphone and a speaker are shown in FIG. 10 and described below with reference to that drawing.) If the link 94 is established with telephone lines, the phone signal can be multiplexed to allow for both voice and data communication between the users. This dual use of the phone signal is possible due to the relatively low-bandwidth of communication required for the shared parameters (e.g., position, direction). By allowing voice communication, the users can talk in real-time while, for example, racing pedal-powered chariots though ancient Rome or playing a competitive ball game.

The communication interconnections described above with reference to FIG. 7 can be referred to as "local networking" or "person-to-person networking" in that each computer of each exercise apparatus on the network can communicate directly with any other computer of any other exercise apparatus on the network. In contrast to the network of FIG. 7 is the "large-scale direct network" of FIG. 8 in which two or more exercise apparatus (four are shown in the disclosed embodiment, namely 96, 98, 100, 102) communicate through a central hub processor 104. Each exercise apparatus 96, 98, 100, 102 is coupled to the hub 104 by a two-way communication link 106, 108, 110, 112 which each can be any of a variety of two-way links as described above with reference to FIG. 7. The hub 104 is responsible for limiting the information directed to each apparatus in the large-scale direct network of FIG. 8. The hub 104 can ensure, for example, that each apparatus only gets (parameter) updates about other users in the same general area of the simulated environment.

Figure 8:
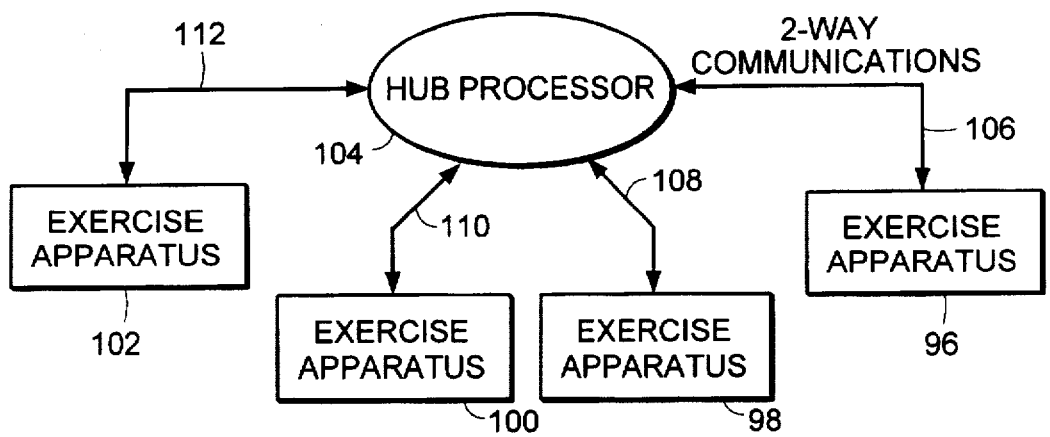
FIG. 8 is a block diagram of a network in which a hub controls communications between two or more exercise apparatus ("nodes") by receiving information from all nodes and directing information to all of, or to a subset of all of, the nodes.
Figure 9:
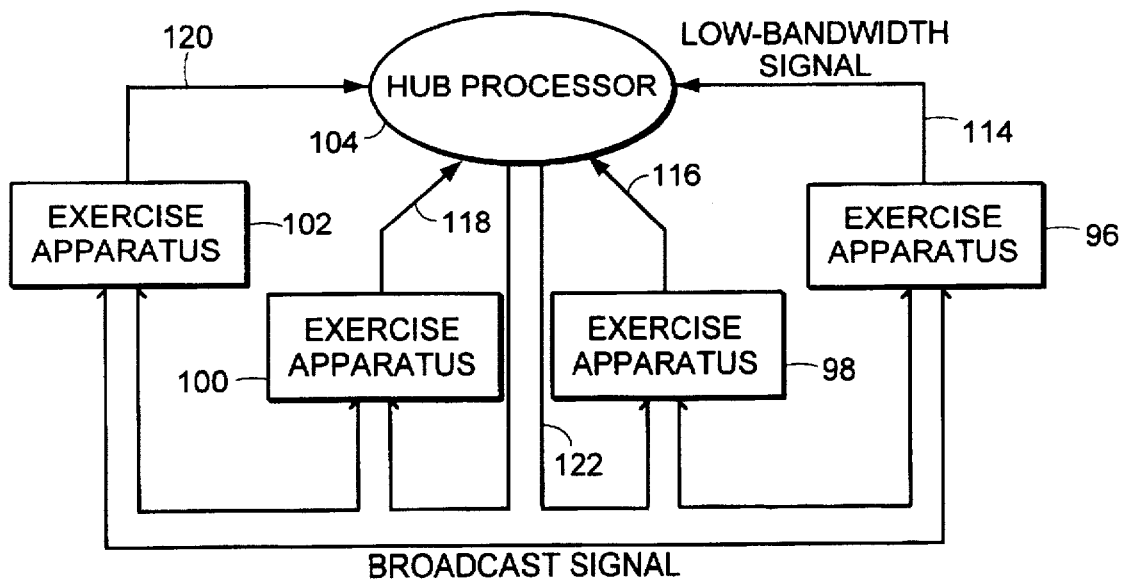
FIG. 9 is a block diagram of a network in which a hub receives information from all network nodes and broadcasts information to all nodes.

Referring to FIG. 9, a "large-scale broadcast network" is shown which is similar to the network of FIG. 8 except that the large-scale broadcast network of FIG. 9 includes two or more exercise apparatus (four are shown) which each (i) send information to the central hub processor 104 over a low-bandwidth line 114, 116, 118, 120 and (ii) receive broadcasts from the hub 104 over a high-bandwidth line 122. Although the low-bandwidth lines are used primarily to send information to the central hub processor, one or more of these lines can be bidirectional lines such as telephone lines. An exercise apparatus connected to the central hub processor by a bidirectional line can receive information from both its high-bandwidth and low-bandwidth lines. In one disclosed embodiment, the high-bandwidth line 122 is a cable TV channel and the low-bandwidth lines 114, 116, 118, 120 are telephone lines or interactive cable TV lines.

In the large-scale broadcast network configuration of FIG. 9, each exercise apparatus 96, 98, 100, 102 listens to all data broadcast by the hub 104 but generally pays attention only to that data which has a bearing on it. The hub 104 preferably groups messages by regions of the simulated environment to facilitate this selective receipt of broadcast data by the exercise apparatus 96, 98, 100, 102. For instance, when the hub receives data transmitted from the user's computer over the low-bandwidth channel, the hub receives the data from all of the concurrent users, processes it in real-time to resolve all collisions and conflicts, groups users in a specific region of the simulated environment into the same group, and then broadcasts the grouped information (e.g., updated position information) over the high-bandwidth channel. The computers in a particular group only listen to information about their group, and they only display information about users in the same general area (i.e., in the same group).

The high-bandwidth channel of FIG. 9 can be used to broadcast the content of the simulation environment database to everyone on the network. If a cable TV channel is employed as the high-bandwidth channel, an entire simulation database can be broadcast in about one to three seconds. By continuously broadcasting one environment after another over a cable TV channel, a hub could provide from 50 to 100 choices, for example, to connected users with virtually no waiting.

Regardless of whether the network is configured as in FIG. 7, FIG. 8, or FIG. 9, the users on the network can be provided with a variety of simulation environment selections (e.g., by menus displayed to them). A wide range of exercise environments could be offered such as environments geared towards competition, education, or the future. In addition, the network could allow users to customize their own virtual environments. This could be done by providing each computer with software capable of modifying existing environments or capable of building new environments from a set of fundamental "blocks" provided to the user. These custom environments could then be shared with others on the network. Also, the network could allow each user to select and/or customize her (or his) icon or symbol which all other users will see on their respective displays. Icon selection can be accomplished by: (i) the central hub presenting each user with a pre-set menu from which the user selects his persona; (ii) the central hub allowing limited editing or customizing of the figures; (iii) software allowing users to build their own icon on their respective computer; or (iv) distributing packaged software with a set of pre-prepared persona.

For these networked systems, the sporting applications are tremendous. Races, games and events could be set-up to allow competition between users physically spread across the globe. In one scenario, a new race environment is designed each week. During the week, users download the course and take training rides to learn the course and plan their strategy. While training they see other athletes and may engage in impromptu competitions. The big race is at a predetermined time. All of those who are interested tune-in and commence an all-out race for the finish. During the race you can jockey for position with other riders and keep track of the leaders. The winners might earn prizes or go on to national and international events. All without leaving your house or health club.

The action is not limited to racing or even competitive simulations. Team sports similar to soccer or football could be implemented as well as scavenger hunts, capture the flag, and other adventure games. One embodiment of an interactive competitive game which can be played using networked exercise apparatus is described in more detail below in the discussion of FIGS. 17A–17C, 18 and 19.

Whether the network configuration is as shown in FIG. 7, FIG. 8, or FIG. 9, the individual exercise apparatus which are interconnected will each have a network interface module of some sort which allows them to communicate. Referring to FIG. 10, the disclosed embodiment of the exercise apparatus 10 includes a network interface module 124 which allows communication over a relatively low-bandwidth telephone line and/or a relatively high-bandwidth cable TV line. The other components of the exercise apparatus 10 were described previously with reference to FIG. 1. Note that any of a variety of other types of exercise machines can be used instead of the apparatus 10 as described previously with reference to FIG. 7.

The computer 18 communicates with the network interface module 124 as indicated by a double-headed arrow 126. The network interface module 124 includes a telephone modem 128 for communication over relatively low-bandwidth telephone lines, and it also includes a voice and data multiplexer and demultiplexer 127 coupled to the modem 128. In the disclosed embodiment, a microphone 121 and an audio mixer 123 are connected to the voice/data mux/demux 127. Audio signals from this voice/data mux/demux 127 are mixed with audio generated by the computer 18 and fed to one or more speakers 15. The network interface module 124 also includes a cable TV interface for communication over relatively high-bandwidth cable TV lines. The cable TV interface includes a cable TV decoder 130 (i.e., an analog-to-digital converter) and a memory buffer 132.

Figure 11:
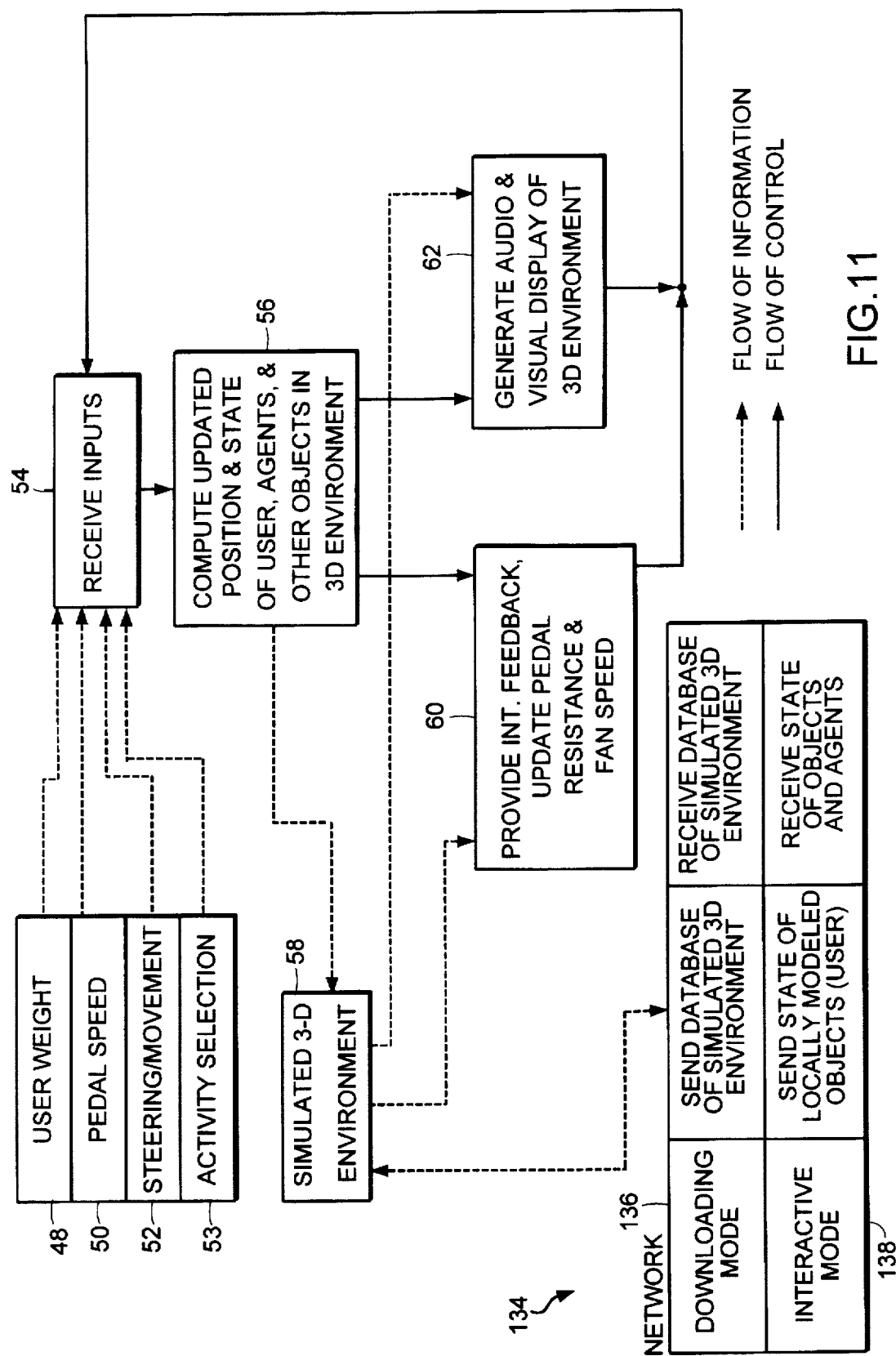
FIG. 11 is a flow chart, similar to the flow chart of FIG. 3, which illustrates a process for determining a user's position as the user freely navigates through a simulated environment.

A general process flow sequence of the interactive software which executes on the computer of each networked exercise apparatus is shown in FIG. 1. FIG. 11 is similar to FIG. 3 except that FIG. 11 is directed to an apparatus which operates in the network configuration of FIG. 7, FIG. 8, or FIG. 9. Steps which the computer takes when networked to other computers are indicated generally by the numeral 134. When the computer is in a downloading mode 136, it is either (i) transmitting a simulation environment database to other computers or to the hub, or (ii) receiving a simulation environment database from other computers or from the hub. When the computer is in an interactive mode 138, it is either (i) transmitting parameters relating to the position, direction, etc. of the user or other locally modeled agents, or (ii) receiving such parameters on other users and agents in the group simulation from their respective computers or from the hub.

Figure 12:
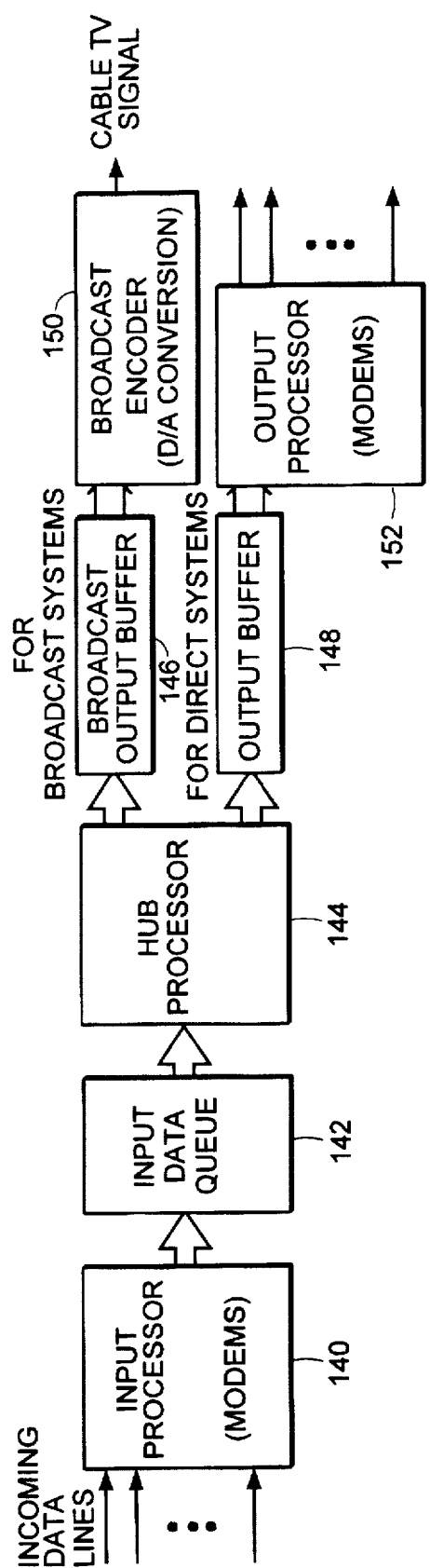
FIG. 12 is a block diagram of the hub of FIG. 8 or FIG. 9.

In the disclosed embodiment, the central hub processor of FIGS. 8 and 9 includes an input processor 140 which receives data from the networked exercise machines, as shown in FIG. 12. In general, the input processor 140 includes one modem for each networked machines, and in this disclosed embodiment, each modem is a telephone modem for receiving signals from the networked machines via the telephone lines. The hub also includes an input data queue 142 which is fed by the input processor 140. The queue 142 holds data for the processor 144 which can be a microprocessor such as those manufactured and sold by Intel, Motorola, or any number of other suppliers. The remainder of FIG. 12 shows two embodiments. The top data stream in FIG. 12 is directed to the embodiment in which the hub is used in the large-scale broadcast network of FIG. 9. The bottom data stream in FIG. 12 is directed to the embodiment in which the hub is used in the large-scale direct network of FIG. 8. Note that the hub can include the components in both the top and bottom data streams of FIG. 12 thereby allowing the same hub to be used in either a direct or broadcast network. In both the broadcast network and the direct network, the hub includes an output buffer 146, 148. In the broadcast network, the hub further includes an encoder 150 which performs digital-to-analog conversions so analog signals can be broadcast over the cable TV channel. In the direct network, the hub further includes an output processor 152 which, like the input processor 140, includes modems for sending signals to the networked machines via the telephone lines.

Figure 13:
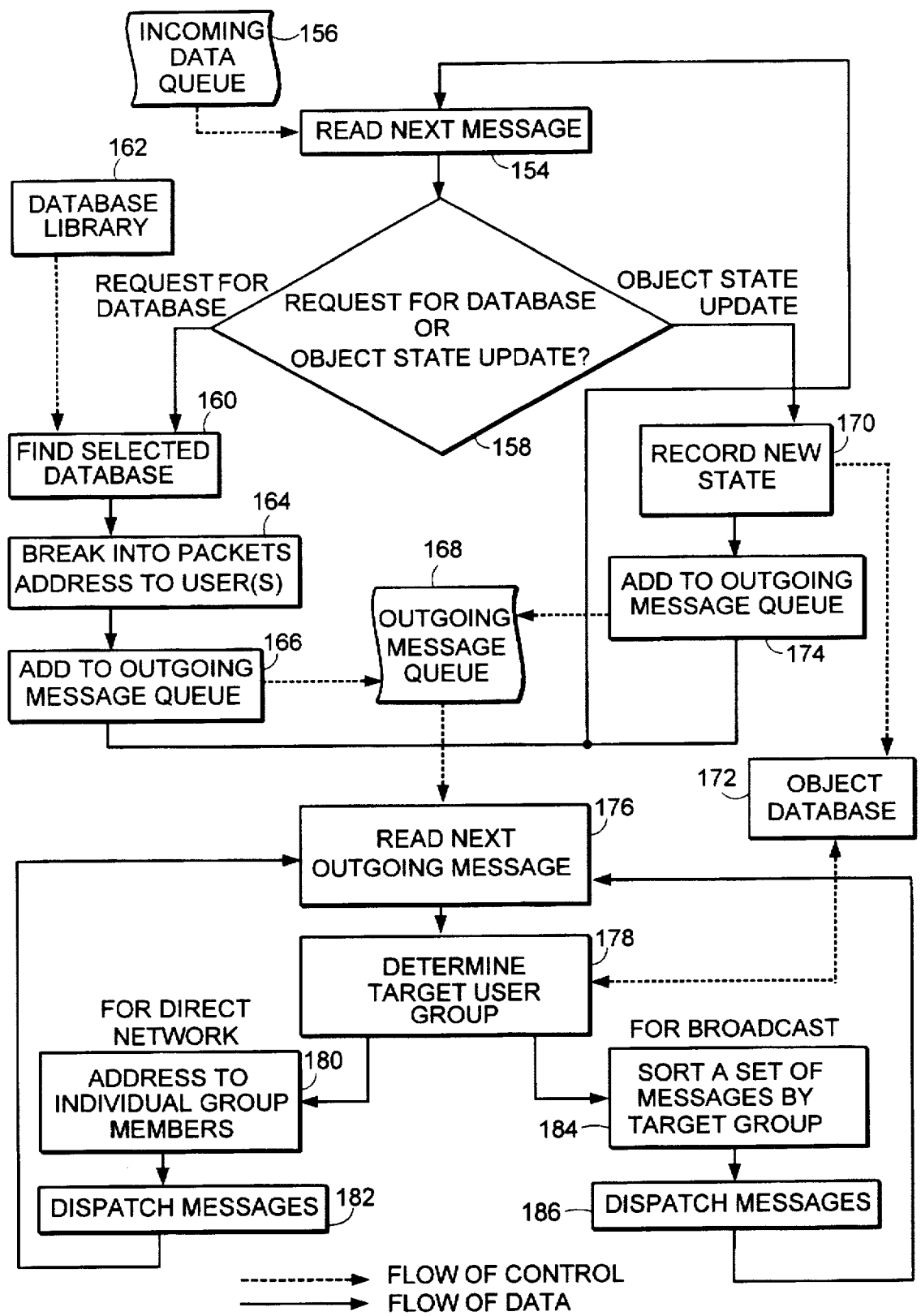
FIG. 13 is a flow chart illustrating a process for message processing in the hub of FIG. 8 or FIG. 9.

A general process flow sequence of the processes performed by the hub of FIG. 8 and the hub of FIG. 9 is shown in FIG. 13. At step 154, the hub of FIGS. 8 and 9 reads information from an incoming queue 156 (which may be the input data queue 142 of FIG. 12 or a separate list built and maintained by the processor 144 from data extracted from the queue 142) and determines at step 158 whether the incoming message is a request for a database or an update (e.g., of a particular networked user's or agent's position, direction, etc. in the simulated environment). If it is a request, the hub locates the requested database (step 160) by searching an externally or internally maintained library of databases 162. The located database is then broken into data packets and addressed to the appropriate user(s) (step 164) and the packets are added (step 166) to an outgoing message queue 168. If it is an update, the hub records the new state of the user's or agent's icon/object (step 170) by referencing an externally or internally maintained object database 172 which contains the location, etc. data on all objects (i.e., users, agents, etc.) in the environment. The new state information is then added (step 174) to the outgoing message queue 168. Next, the hub takes messages (step 176) from the outgoing message queue 168 and determines which group of users should receive the message (step 178) by referencing the object database 172. The remaining steps the hub performs depend on whether the hub is used in the large-scale direct network of FIG. 8 or the large-scale broadcast network of FIG. 9. If in the large-scale direct network configuration, the hub addresses the outgoing message to the individual networked machines which need to receive the message (step 180). The message is then sent (step 182). If in the large-scale broadcast network configuration, the hub sorts the outgoing messages into groups (step 184) and then broadcasts to all networked machines (step 186).

Figure 14A:
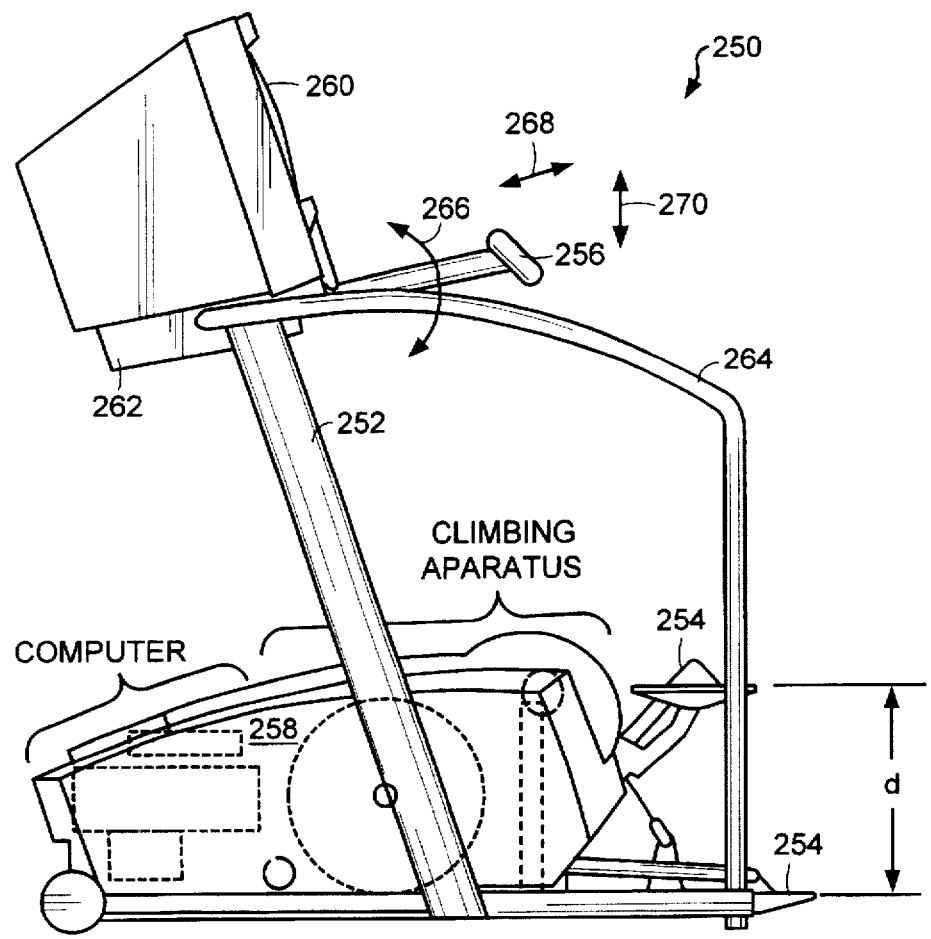
FIG. 14A is a side view of an interactive stair climbing simulator exercise apparatus according to the invention with some of the internal components shown in dotted lines.

Referring to FIG. 14A, a virtual climber 250 according to the invention comprises a supporting frame 252, a pair of pedals or steps 254 coupled to a climbing apparatus within a housing 258, a movable handle 256 for steering, and a display system 260. The computer also is located within the housing 258, and its purpose and functionality is the same as that described previously for the computer in the virtual bike. For instance, the computer of the virtual climber performs generally the same monitoring, controlling, feedback (e.g., visual, sound, and/or interactive), tour guides or agents functions, networking functions, etc. While the display system 260 is shown as a monitor, it is possible for it to be a head-mounted display or a plurality of monitors, as shown and described previously for the virtual bike embodiment of the invention. Below the monitor is a housing 262 into which the handles extend and which contain steering apparatus. Part of the frame 252 is a pair of stationary rails 264 which can be useful in mounting and dismounting the steps 254. These rails 264 can be optional. One or more speakers preferably are located somewhere in or on the virtual climber 250 (e.g., in the monitor).

A user of the virtual climber 250 manipulates the steps 254 and/or the handle 256 to travel substantially unrestricted throughout the environment displayed on the display. To accomplish this, the processor 18 monitors the user's manipulations of the steps 254 and the handle steering mechanism 256 to determine user position in the simulated environment. The handle is movable at least in one direction such as side-to-side (as indicated by an arrow 266) and preferably in any of six degrees of freedom, i.e., side-to side (arrow 266), in and out (arrow 268), and up and down (arrow 270). The computer controls the level of difficulty of the steps 254 (e.g., the speed of the climb) to simulate characteristics of the environment. The environment preferably is an interactive simulated three-dimensional environment and more preferably an interactive simulated threedimensional fluid environment such as an underwater environment or an in-air environment. For example, the user can climb higher into the air the harder or faster he or she pedals or climbs.

Figure 15:
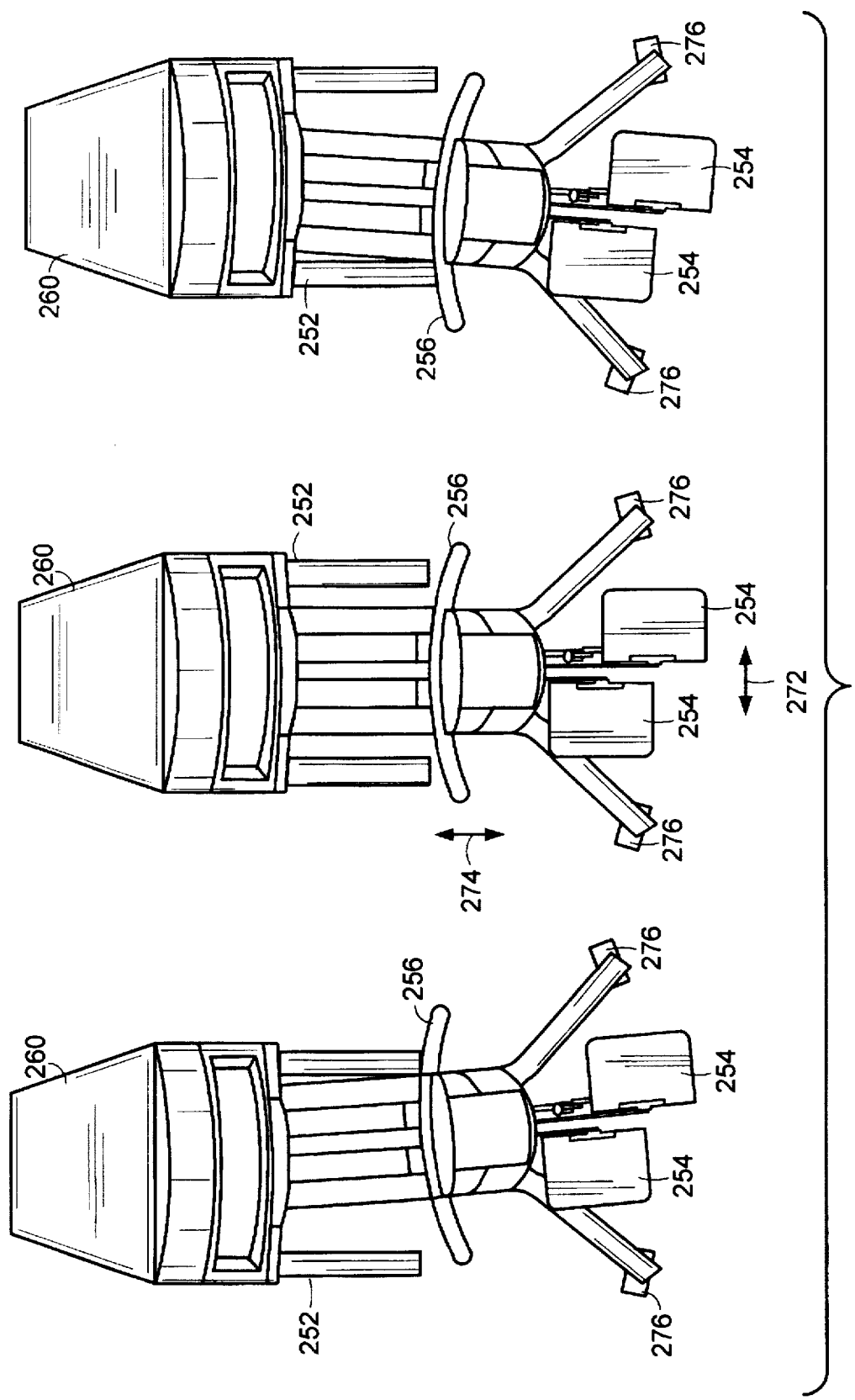
FIG. 15 is a top perspective view of an interactive stair climbing simulator exercise apparatus in which the steps and the handle move in correspondence to the user's manipulations thereof.

Referring to FIG. 15, in some preferred embodiments, the steps 254 and the handle 256 move together in response to the user's manipulations of the handle and/or the steps. The movement is at least in one direction such as side-to-side (arrow 272) as shown, and preferably is in any of six degrees of freedom such as side-to-side, in toward the display 260 and back away from the display 260 (arrow 274), and up and down (into and out of the page). If a user turns the handle left or right (arrow 266 in FIG. 14A), the steps and handle move correspondingly left or right while the display 260 and supporting frame 252 remain stationary. In the disclosed embodiment, wheels 276 allow the side-to-side movement, and the steps, handle, and housing 258 all move together.

Unlike most known stair climbing simulators which use stairs or pedals that drop towards the ground at a fixed speed (either machine-set or manually adjustable) regardless of the speed at which the user is climbing/exercising, the virtual climber of the invention may also provide automatic adjustment of the speed of the steps based on the user's climbing/exercising speed and a user-selected or computer-selected (based on activities in the virtual world) height off of the ground. Referring to FIG. 14A, the automatic adjustment is performed in order to keep the user at the desired height or distance above the ground, d. Some users associate that distance, d, with the quality or effectiveness of the workout. The computer monitors and controls the steps to provide the proper resistance to keep the exercising user at one of a plurality of user-selectable or computer-determined (based on activities in the virtual world) heights above the ground. The value of "d" can be input to the computer via the intuitive input method described previously. The user can climb/exercise at any speed he or she desires, and the user's height above the ground is automatically maintained at substantially the user-selected value.

Figure 16:
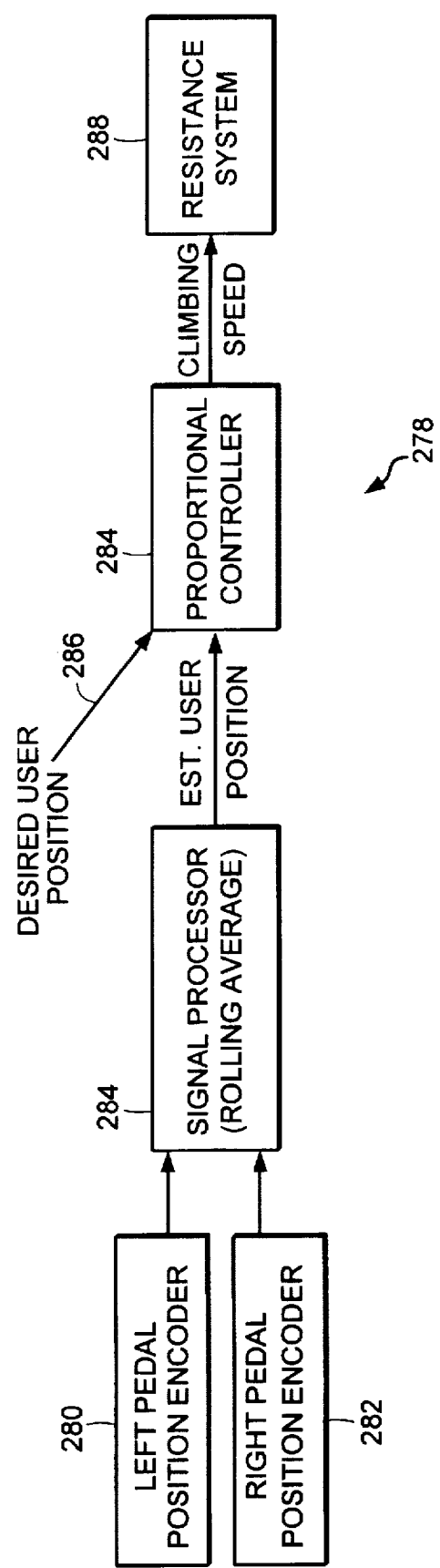
FIG. 16 is a block diagram of a position controller for use with a virtual climber according to the invention.

Referring to FIG. 16, a position controller 278 includes two digital position encoders 280, 282. One of the encoders 280 is associated with the left stepper, and the other encoder 282 is associated with the other stepper. The encoders are mounted on the stepper axles and are used to track the position of the steps. The actual vertical position of the user can be inferred from the stepper position by signal processing methods. In the disclosed embodiment, the computer 284 in the housing 258 processes the signals coming from the encoders 280, 282 to remove the oscillatory portion of the stepper position and determine the user's average actual vertical position. It is preferred to use a sliding average of the left and right stepper positions in which the average is taken over the period of one stepper stroke. Other methods of measuring the user's vertical position can be used such as a retractable cord tied to the user's belt. The computer 284 then compares this estimated vertical position to the desired, user-selected distance, d (286), using a proportional control law. This law is given by equation (1) below in which CS is the climbing speed, G is the gain, EVP is the estimated vertical position, and DVP is the desired vertical position (i.e., d).

$$CS = G * (EVP - DVP) \quad (1)$$

If the comparison indicates that the user is above the distance "d", the computer 284 speeds up the rate at which the steps fall (i.e., decreases the resistance of the steps). This has the effect of lowering the user toward the desired height "d" if the user maintains the same level of exercise that resulted in his or her rise to the too-high height. Conversely, if the user has fallen too low (because he or she is not working hard enough), the stepper resistance is decreased to allow the user to rise higher while working at the same level. In the disclosed embodiment, the proportional controller uses a proportional control law to determine the input to the stepper resistance system 288. Note that the signal processor and proportional controller functions can be performed by hardware separate from the computer. The position controller 278 thus automatically keeps the user at substantially the desired height, d, regardless of how fast or slow the user is climbing or if the user alters his or her speed over the course of the workout.

Figure 14B:
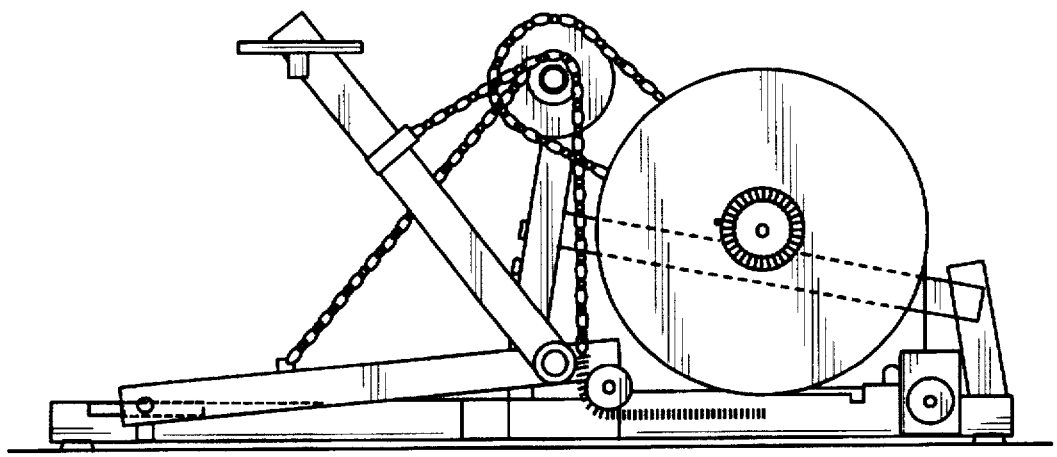
FIG. 14B is a more detailed diagram of some of the internal components shown in FIG. 14A.

Referring to FIG. 14A, the housing which contains the computer also contains the climbing apparatus, as indicated previously with reference to the same drawing. The climbing apparatus is shown in more detail in FIG. 14B. Many different types of climbing mechanisms may be suitable such as the one described in U.S. Pat. No. 4,938,474 to Sweeney et al.

Figure 17A:
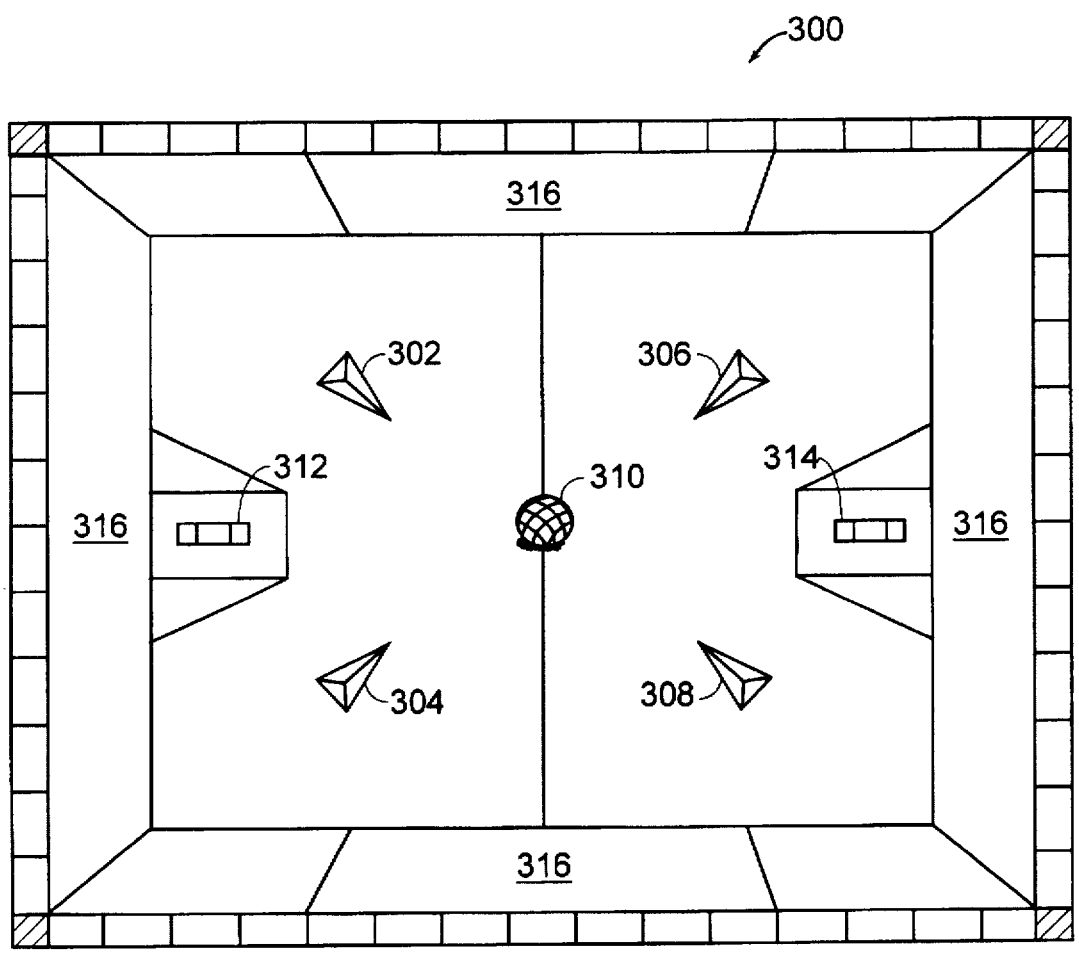
FIG. 17A is a pictorial view of the graphic display of an overhead view of an embodiment of a game field, showing the actual position of the participants and the game ball on the game field.
Figure 17B:
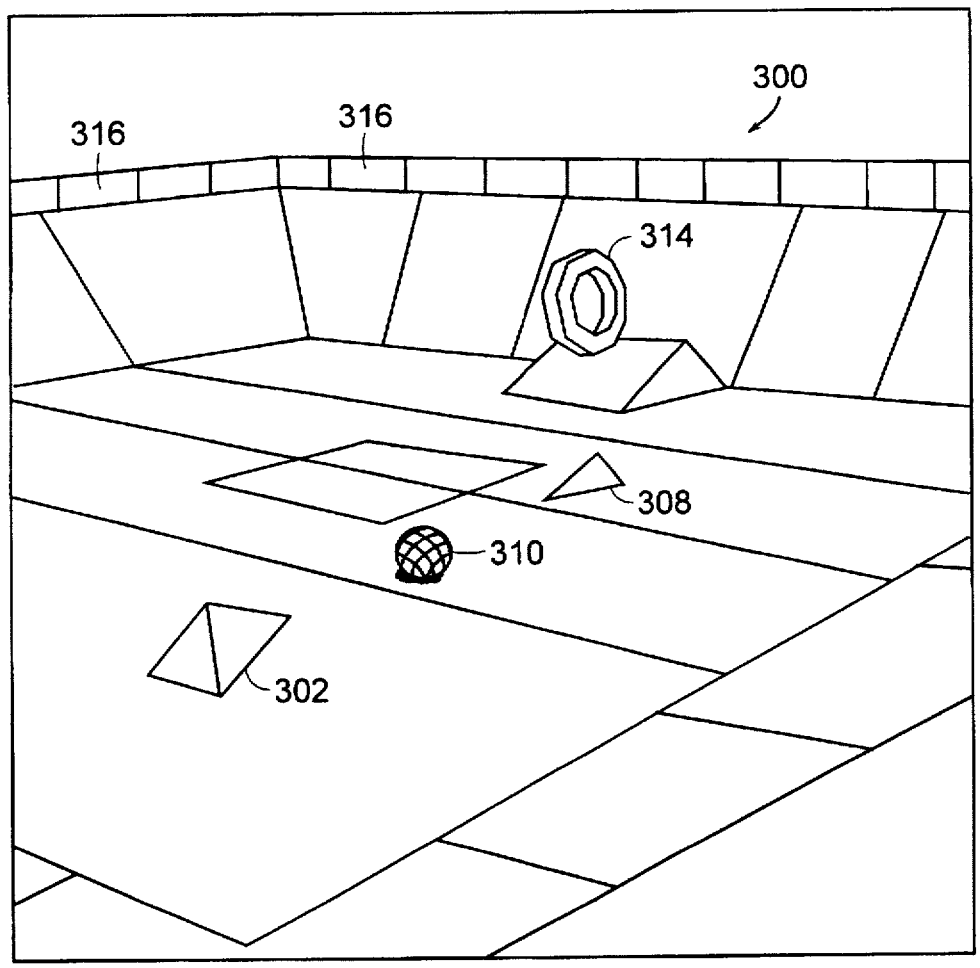
FIG. 17B is a pictorial view of the graphic display of a side view of the game field of FIG. 17A, showing the position of the participants and the game ball on the game field.
Figure 17C:
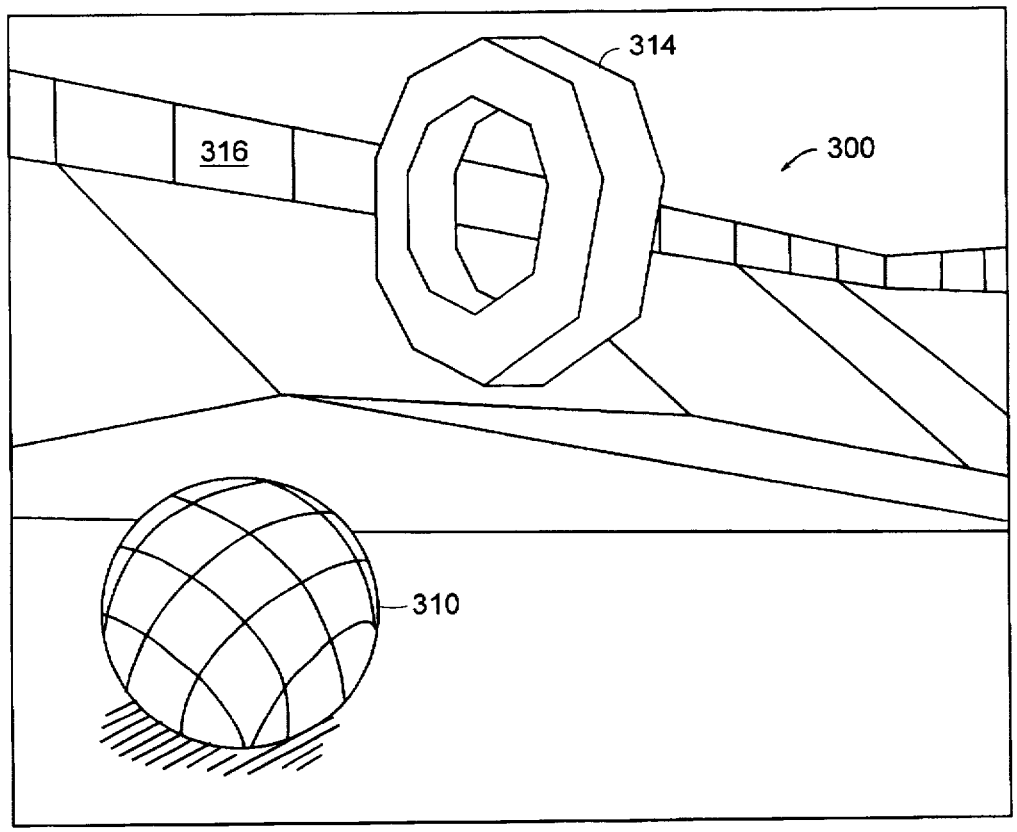
FIG. 17C is a pictorial view of the graphic display of a close-up side view of the game ball and one of the goals of FIGS. 17A and 17B.

As mentioned previously with reference to FIGS. 7, 8, and 9, two or more exercise apparatus may be networked together. With two or more exercise apparatus networked together, the computers of each apparatus can communicate and share information and allow the users to navigate in the same simulated environment and to act as teammates or competitors. For these networked systems, the competitive game applications are tremendous. FIGS. 17A–17C show one embodiment of an interactive competitive ball game which can be played using networked exercise apparatus. The competitive ball game simulates real world physics and interactions between game objects, including the players, game field and ball. Referring to FIGS. 17A–17C, the ball game is played on a game field 300. FIG. 17A is an overhead view of the game field 300 and FIGS. 17B and 17C are side views of the game field 300 from the perspective of the user playing the game. Each user is represented on the game field 300 by a virtual vehicle 302, 304, 306, or 308. In other embodiments, each user may be represented by simulated human body or other form. The object of the game is to score the highest amount of points by shooting the virtual ball 310 through one of the virtual goals 312, 314 located at the ends of the game field 300. Each team is assigned to one of the virtual goals 312, 314. In the embodiment shown in FIG. 17A, the game field 300 is rectangular in shape and has four stadium walls 316. The stadium walls 316 are real boundaries to the game. While the virtual vehicles 302, 304, 306, 308 may travel unrestricted throughout the game field 300, the virtual vehicles 302, 304, 306, 308 cannot exit the game field 300. In yet other embodiments, the game field 300 may have a different shape.

In the embodiment shown in FIG. 17A, two teams each having two players are competing. Each virtual vehicle 302, 304, 306, 308 may represent a computer-generated player or may represent one exercise apparatus in the network. For example, a single exercise apparatus may be represented by the virtual vehicle 302 and the remaining virtual vehicles 304, 306, 308 may represent computer-generated players. In this manner a single user may play against a computer-generated opponent or a group of users may form teams and play against each other.

Figure 18:
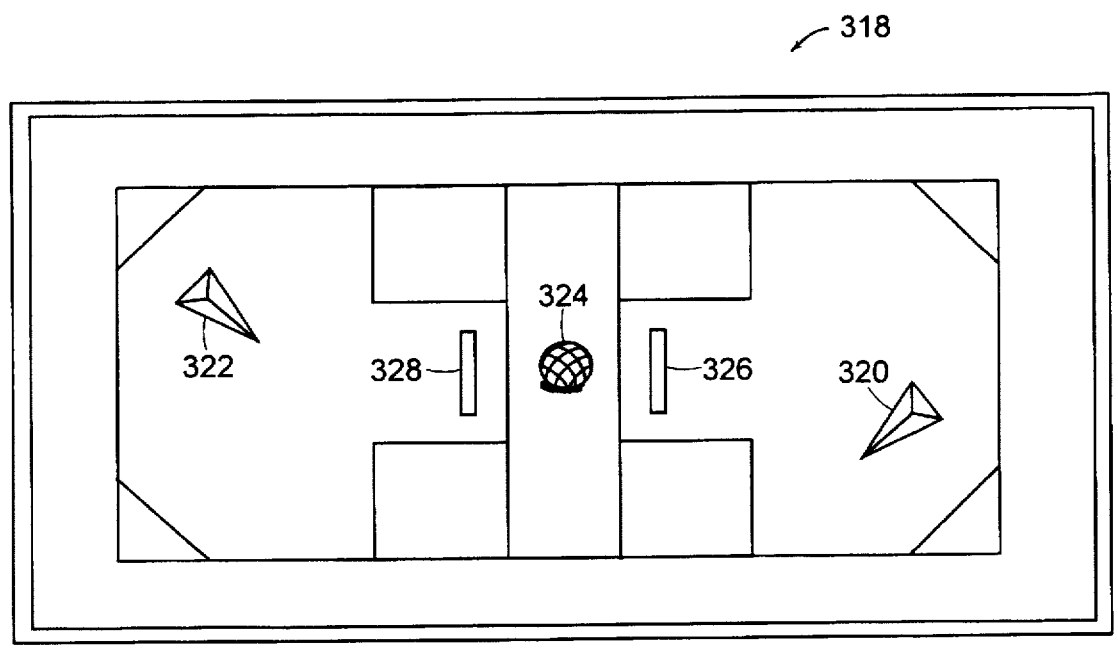
FIG. 18 is a pictorial view of the graphic display of an overhead view of another embodiment of a game field, showing the actual position of the participants and the game ball on the game field.

FIG. 18 shows another embodiment of an interactive competitive ball game which can be played using networked exercise apparatus. Similar to the interactive ball game shown in FIGS. 17A–17C, the ball game of FIG. 18 is played on a game field 318 and each user is represented by a virtual vehicle 320, 322. The object of the game is to score the highest amount of points by shooting the virtual ball 324 through one of the virtual goals 326, 328.

Figure 19:
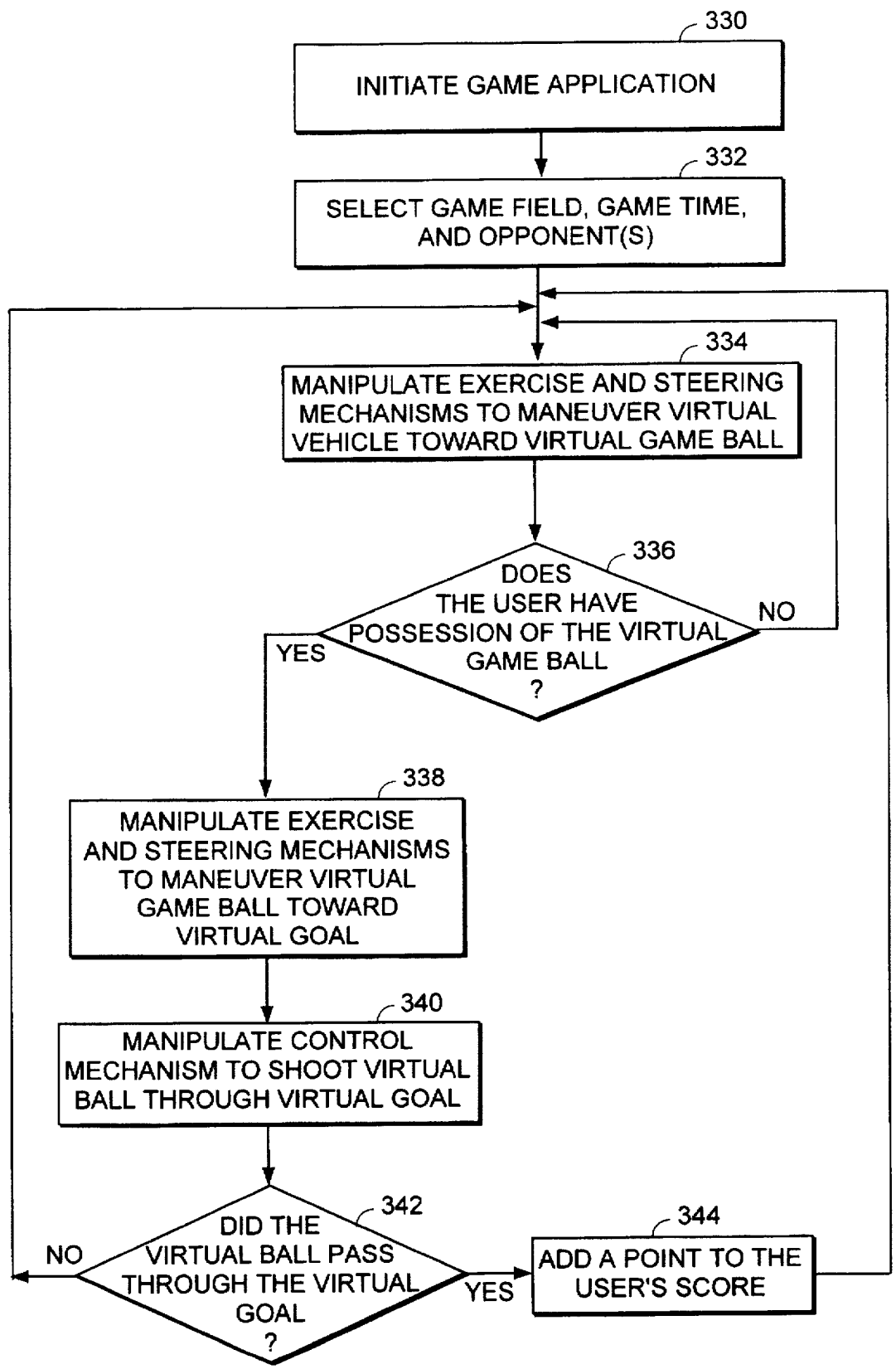
FIG. 19 is a flow chart illustrating the steps performed by a user in playing a virtual game using an interactive exercise apparatus.

Referring to FIG. 19, a flow chart illustrates the steps performed by a user playing the virtual game shown in FIGS. 17A–17C using an interactive exercise apparatus. In one embodiment, the user is riding the interactive exercise cycle described above and shown in FIG. 2A. In another embodiment, the user is utilizing the interactive stair climbing simulator exercise apparatus described above and shown in FIG. 14A. To begin the game, first the user initiates the game application (step 330). Next, the user selects the game field, the game time and the opponent(s) (step 332). The game field may be the game field 300 shownin FIG. 17A or the game field 318 shown in FIG. 18. In one embodiment, the game time is a set amount of time and the player scoring the highest number of goals at the end of the set amount of time is the winner. In another embodiment, rather than selecting a set amount of time for the game, the user selects a target score. The first player to reach the target score is the winner. The user may select to play against a computer-generated opponent or against another user. The user may also select to form a team with a computer-generated player or another user.

After the user has selected the game field, game time and opponent(s), the game begins. The user manipulates the exercise mechanism 14 and the steering mechanism 16 of the exercise apparatus (shown in FIG. 1) to maneuver the virtual vehicle representing the user toward the virtual game ball (step 334). For example, in the embodiment shown in FIGS. 17A–17C, the user of one of the networked exercise apparatus may be represented by the first virtual vehicle 302. The user manipulates the exercise mechanism 14 and the steering mechanism 16 to maneuver the virtual vehicle 302 toward the virtual ball 310. The more vigorously the user manipulates the exercise mechanism 14, the faster the virtual vehicle 302 travels in the simulated game field 300. In one embodiment, the weight of the user is figured into the speed of the virtual vehicle 302. For example, a heavier user must exert more energy to have the virtual vehicle 302 travel at the same speed of a lighter user exerting less energy. In another embodiment, the weight of the user is taken into account in the simulation of collisions between the user and virtual objects in the simulated environment.

If the user is utilizing the exercise cycle 22 of FIG. 2A, the user manipulates the pedals 27 and the handles 30 to maneuver the virtual vehicle 302 toward the virtual ball 310. The user may begin pedaling in the default gear or select a desired gear by manipulating a gear select control on the exercise cycle. In one embodiment, the gear select control is a push button located on the handles 30 of the exercise cycle. The user may also shift gears anytime during the game by manipulating the gear select control.

If the user is utilizing the stair climbing simulator exercise apparatus 250 described above and shown in FIG. 14A, the user manipulates the steps 254 and the handle 256 to maneuver the virtual vehicle 302 toward the virtual ball 310.

The user may gain possession of the virtual ball 310 by colliding the virtual vehicle 302 with the virtual ball 310. The user may also gain possession of the virtual ball 310 by stealing the ball 310 away from another player. A player can steal the virtual ball 310 by getting close to the virtual ball 310 and bumping or shooting it away from the player in possession of the virtual ball 310. Finally, a user may gain possession of the virtual ball 310 by receiving a pass from another player. Players can pass the virtual ball 310 to each other by shooting the virtual ball 310 in the appropriate direction. The user continues to manipulate the exercise mechanism 14 and the steering mechanism 16 (shown in FIG. 1) until the virtual vehicle 302 collides with the virtual game ball 310 and the user has possession of the virtual game ball 310 (steps 334, 336). Once the virtual vehicle 302 has possession of the virtual game ball 310, the user manipulates the exercise mechanism 14 and the steering mechanism 16 of the exercise apparatus to maneuver the virtual ball 310 toward one of the virtual goals 312, 314 (step 338). Once the virtual game ball 310 is in close proximity to the appropriate virtual goal 312 or 314, the user manipulates a control mechanism to shoot the virtual ball 310 through the virtual goal (step 340). In one embodiment, the control mechanism for shooting the virtual ball 310 is a push button located on one of the handles of the exercise apparatus. The user may vary the force applied to the virtual ball 310 by pressing the push button for different periods of time. In one embodiment, the longer the user presses the push button, the greater the force applied to the virtual ball 310.

Once the user has shot the virtual ball 310, the user must wait and see if the virtual ball 310 passes through the target virtual goal (step 342). If the virtual ball 310 did not pass through the target virtual goal, the user returns to step 334 and manipulates the exercise mechanism 14 and the steering mechanism 16 to maneuver the virtual vehicle 302 toward the virtual ball 310. If the virtual ball 310 passed though the target virtual goal, the computer adds one point to the user's score (step 344). The user then repeats steps 334–344 until the end of the game.

To make the game more interesting, in one embodiment a player can collide its virtual vehicle with another player's virtual vehicle to set a pick, knock the ball away from the other player, interfere with a shot, etc. In yet another embodiment, players may be handicapped to have even matches between players of different fitness and skill levels.

In one embodiment, each exercise apparatus has a view control. The view control may be a push button control located on one of the handles of the exercise apparatus. The view control allows the user to change the view displayed on the display system between an overhead view and a side view. If the user selects the overhead view, the display system will display an aerial view of the game field 300, similar to the view shown in FIG. 17A. If the user selects the side view, the display system will display a side view of the game field as viewed by the virtual vehicle representing the user. FIG. 17C shows a side view of the game field 300 as viewed by a virtual vehicle approaching the virtual ball 310.

Figure 20:
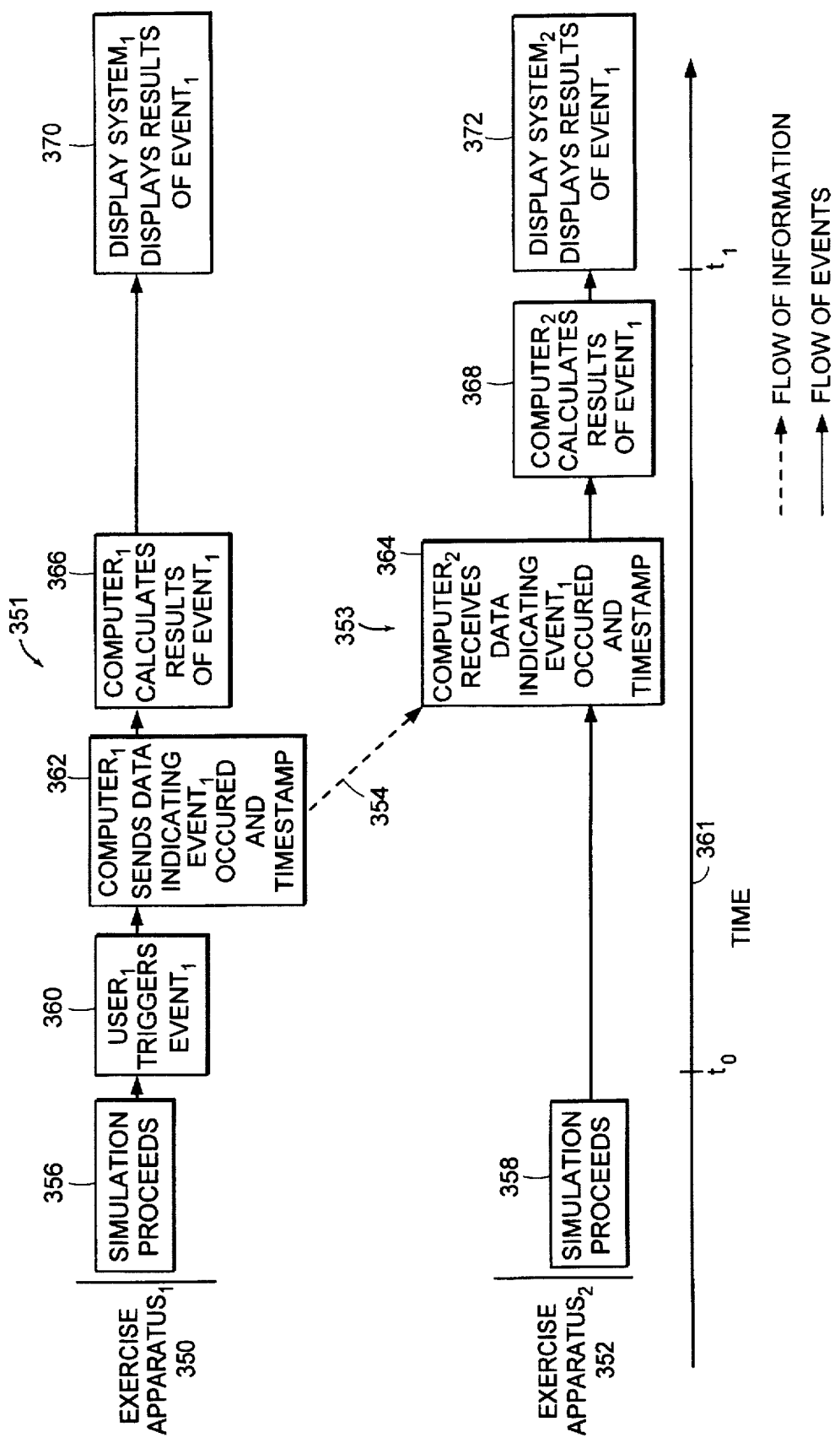
FIG. 20 is set of flow charts illustrating one process for simultaneously displaying the results of an event occurring on one networked interactive exercise apparatus on the display of each interactive exercise apparatus in the network.

Referring to FIG. 20, a set of flow charts illustrates one process for simultaneously displaying the results of an event occurring on one networked interactive exercise apparatus on the display of each interactive exercise apparatus in the network. When two or more exercise apparatus are networked together according to the network shown in FIG. 7, FIG. 8 or FIG. 9, it is important that the display of each exercise apparatus display the same simulated environment to its user. The process shown in FIG. 20 illustrates one method to compensate for the latency of the network with respect to certain predetermined events. This method allows each user on the network to simultaneously view the results of an event caused by one of the networked exercise apparatus.

In the embodiment of the process described by FIG. 20, a computer of a first exercise apparatus 350 (EXERCISE APPARATUS$_1$) is interconnected with a computer of a second exercise apparatus 352 (EXERCISE APPARATUS$_2$) via a two-way communication link. This network configuration is similar the network configuration described above and shown in FIG. 7. While the flow charts of FIG. 20 only illustrate the series of steps performed for a network containing two exercise apparatus, the series of steps could be applied to a network containing more than two exercise apparatus networked together.

In FIG. 20, the top flow chart 351 illustrates the series of steps performed by the computer of the first exercise apparatus 350 and the bottom flow chart 353 illustrates the series of steps performed by the computer of the second exercise apparatus 352. The dotted arrow 354 illustrates a flow of information from the first exercise apparatus 350 to the second exercise apparatus 352. Both of the exercise apparatus 350, 352 have stored in memory time delays associated with predetermined events. In the first step of both flow charts 351, 353 (steps 356 and 358, respectively), the computer of each exercise apparatus generates the simulated environment and displays the simulated environment on the display of the exercise apparatus. During the generation of the simulated environment in the computer of the first exercise apparatus 350 (time $t_0$ on the timeline 361), the user of the first exercise apparatus 350 triggers one of the predetermined events having an associated time delay (step 360). In order to simultaneously display the results of the predetermined event on the displays of both exercise apparatus 350, 352, the first exercise apparatus 350 delays the generation of the simulated environment for the time delay associated with the predetermined event and sends data to the computer of the second exercise apparatus 352 indicating that the predetermined event occurred (step 362). Arrow 354 represents the transmission of data from the first exercise apparatus 350 to the second exercise apparatus 352. The data sent to the second exercise apparatus 352 includes a timestamp indicating when the predetermined event occurred in the first exercise apparatus 350.

The computer of the second exercise apparatus 352 receives the data indicating that the predetermined event occurred in the first exercise apparatus 350 and the timestamp (step 364). The amount of time that the data takes to travel from the first exercise apparatus 350 to the second exercise apparatus 352 is less than the time delay associated with the predetermined event. Both computers then calculate the results of the predetermined event in the simulated environment (steps 366 and 368 respectively).

After the time delay associated with the predetermined event (time $t_1$ on the timeline 361), the display systems of both exercise apparatus 350, 352 simultaneously display the results of the predetermined event (steps 370 and 372 respectively).

One application of the process illustrated by the set of flow charts 351, 353 in FIG. 20 is the competitive ball game described above and shown in FIGS. 17A–17C and 18. If two or more users are playing the competitive ball game, without the process illustrated by the set of flow charts in FIG. 20, all users will not view the virtual ball being shot at the same time. The users will not view the shot simultaneously because of the amount of time required for the data indicating that a shot was released to travel from the exercise apparatus triggering the shot to the other exercise apparatus on the network. The process of FIG. 20 can be used to simultaneously display a shot triggered by one networked interactive exercise apparatus on the display of each interactive exercise apparatus in the network.

For example, a 0.1 second delay can be associated with the triggering of a shot and this value can be stored in the memory of the computers of each exercise apparatus on the network. When a user triggers a shot on the first exercise apparatus 350 (step 360), the computer of the first apparatus 350 delays displaying the release of the shot for 0.1 seconds. The computer of the first apparatus 350 also sends data to the computer of the second exercise apparatus 352 indicating that a shot was triggered (step 362). The sent data includes the direction and the power of the shot. The sent data also includes a timestamp indicating when the shot was triggered. The computer of the second exercise apparatus 352 receives the data indicating that a shot was triggered (step 364). Both computers then calculate the trajectory of the shot release to be displayed to the user (steps 366 and 368, respectively). The computer of the second exercise apparatus 352 also determines the time at which the release of the shot should be displayed to the user based on the timestamp received from the computer of the first exercise apparatus 350 and the time delay associated with a triggered shot stored in the computer's memory. After the time delay associated with a triggered shot (at time $t_1$ on the timeline 361), the computers of both exercise apparatus 350, 352 simultaneously display the shot being released (steps 370 and 372, respectively).

Figure 21:
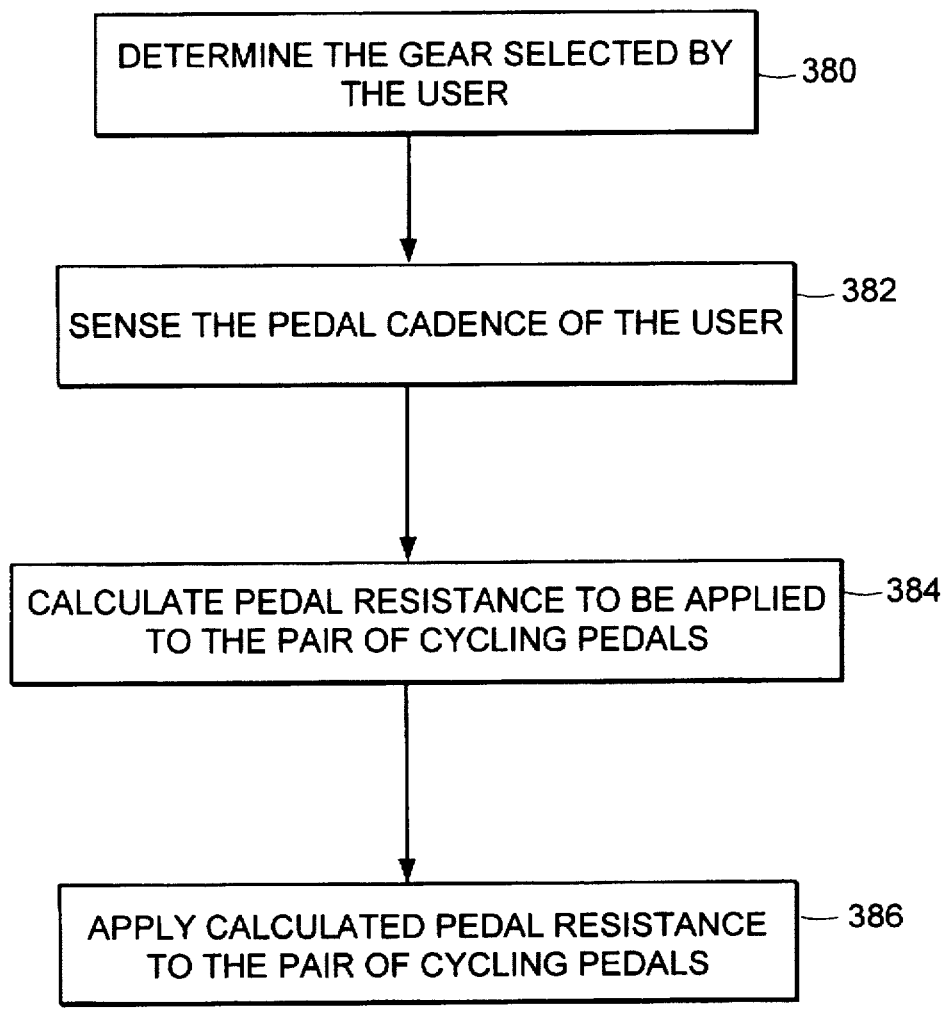
FIG. 21 is a flow chart illustrating one process for determining pedal resistance to be applied to the pair of cycling pedals of the interactive exercise cycle of FIG. 2A as the user navigates through the simulated environment.

As described above in the discussion of FIG. 6, the apparatus of the present invention can employ a traditional freewheel and flywheel to provide pedaling resistance. However, a closed loop digital control system may be employed instead. As such, pedaling resistance would be provided by a simpler drive mechanism controlled electronically by a digital control system to provide for smooth pedaling strokes. Referring to FIG. 21, a flow chart illustrates one process for determining pedal resistance to be applied to the pair of cycling pedals 27 of the interactive exercise cycle of FIG. 2A by the digital control system 82 (shown in FIG. 6).

In one embodiment, the computer 32 of the interactive exercise cycle 22 of FIG. 2A includes a bicycle transmission module. The bicycle transmission module simulates a plurality of bicycle gears which the user can select. Each gear has a threshold pedal cadence ($W_0$), an inflection point pedal cadence ($W_1$), and a maximum torque value ($\tau_{MAX}$). The user manipulates the pair of cycling pedals 27 (shown in FIG. 2A) to attain the threshold pedal cadence and achieve a change of position in the simulated environment. The threshold pedal cadence ($W_0$), the inflection point pedal cadence ($W_1$) and the maximum torque value ($\tau_{MAX}$) are predetermined values stored by the computer of the exercise apparatus. In one embodiment, the threshold pedal cadence ($W_0$) is approximately 40 rotations per minute and the inflection point pedal cadence ($W_1$) is approximately 110 rotations per minute.

Figure 22A:
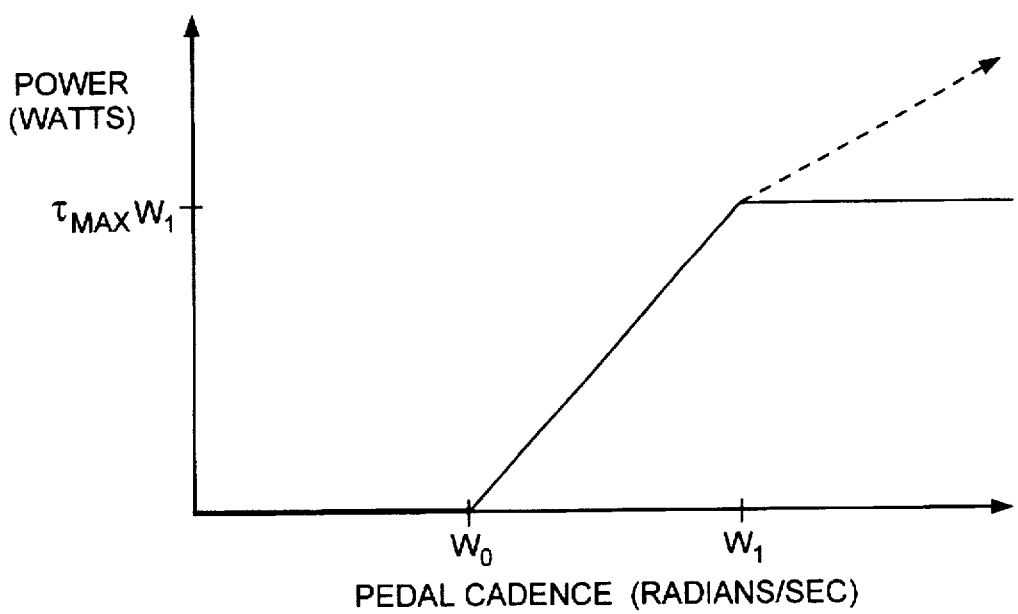
FIG. 22A is a chart illustrating power output of a user of an interactive exercise cycle incorporating the process illustrated in FIG. 21 for different pedal cadences.
Figure 22B:
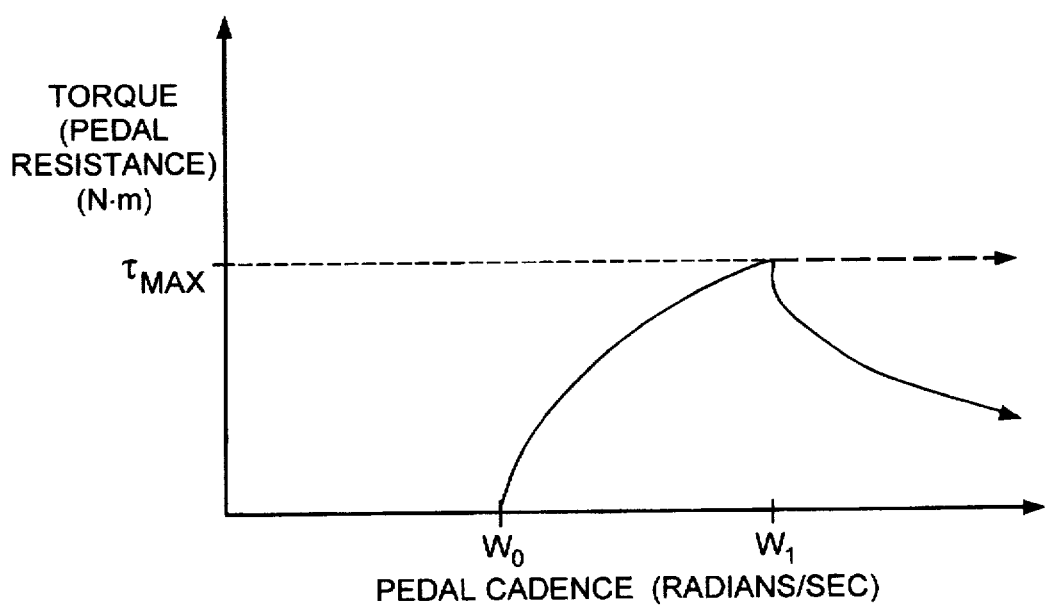
FIG. 22B is a chart illustrating pedal resistance to be applied to the pair of cycling pedals of an interactive exercise cycle incorporating the process illustrated in FIG. 21.

The bicycle transmission module first determines the gear selected by the user (step 380). Next a sensor senses the pedal cadence of the user (step 382). The bicycle transmission module then calculates the pedal resistance to be applied to the pair of cycling pedals in response to the gear selected by the user and the actual user pedal cadence (step 384). The calculation of the pedal resistance to be applied to the pair of cycling pedals is independent of the virtual velocity of the user in the simulated environment. The bicycle transmission module calculates the pedal resistance according to one of the two methods shown in the charts of FIGS. 22A and 22B. FIG. 22A is a chart illustrating the power output of a user of the interactive exercise cycle of FIG. 2A for different user pedal cadences. FIG. 22B is a chart illustrating the torque/pedal resistance to be applied to the pair of cycling pedals for different user pedal cadences.

In both methods, if the actual user pedal cadence (W) is less than the threshold pedal cadence ($W_0$) of the user selected gear, the bicycle transmission module calculates the torque or pedal resistance to be approximately zero N·m.

In both methods, if the actual user pedal cadence is less than the inflection point pedal cadence ($W_1$) of the user selected gear, but greater than the threshold pedal cadence ($W_0$) of the user selected gear, the bicycle transmission module calculates the pedal resistance to be applied to the pair of cycling pedals in response to a ratio of the threshold pedal cadence ($W_0$) to the actual user pedal cadence (W) as described below. The power output (P) of a user can be calculated according to equation (2) below in which τ represents the torque value (N·m) applied by the pedal resistance device 28 (shown in FIG. 2A) and W represents the pedal cadence (radians/second) of the user.

$$P = \tau \cdot W \quad (2)$$

The power output (P) of a user can also be calculated according to equation (3) below in which $\tau_{MAX}$ represents the maximum torque value (N·m) which can be applied by the pedal resistance device 28 for a selected gear, $W_0$ represents the threshold pedal cadence for the selected gear, W represents the pedal cadence (radians/second) of the user, and $W_1$ represents the inflection point pedal cadence of the selected gear.

$$P = \frac{\tau_{MAX} W_1}{(W_1 - W_0)} (W - W_0) \quad (3)$$

Substituting equation (3) into equation (2) and solving for τ yields equation (4) below.

$$\tau = \frac{\tau_{MAX} W_1}{(W_1 - W_0)} \left(1 - \frac{W_0}{W}\right) \quad (4)$$

For the range of pedal cadences between $W_0$ and $W_1$, the pedal resistance or torque applied to the pair of cycling pedals is governed by equation (4) above.

If the actual user pedal cadence is greater than the inflection point pedal cadence ($W_1$) of the user selected gear, in one method shown as the solid line in FIGS. 22A and 22B, the bicycle transmission module calculates pedal resistance to be applied to the pair of cycling pedals such that the power output supplied by the user equals $\tau_{MAX}W_1$. In another method shown as the dashed line in FIGS. 22A and 22B, the bicycle transmission module sets the pedal resistance to be applied to the pair of cycling pedals equal to the maximum torque value ($\tau_{MAX}$) of the user selected gear. The maximum torque value ($\tau_{MAX}$) is determined by the user selected gear.

Once the transmission module calculates the pedal resistance to be applied to the pair of cycling pedals 27, the pedal resistance device 28 applies the calculated pedal resistance to the pair of cycling pedals 27 (step 386).

Typical stationary exercise bikes simulate a real bike transmission, or implement a constant-power model in which torque falls of as user pedal cadence increases. The transmission module described above uses models in which pedal cadence is linearly related to power output when the user's pedal cadence is between the threshold pedal cadence and the inflection point pedal cadence of the selected gear. These models enable a user to exert more power by pedaling at a higher cadence, yet do not confront the user with an uncomfortably large torque as often happens when the user is in too high of a gear in a real-world bike simulation transmission. The models illustrated by the charts of FIGS. 22A and 22B allow a user to easily begin pedaling regardless of the gear selected by the user.

Figure 23:
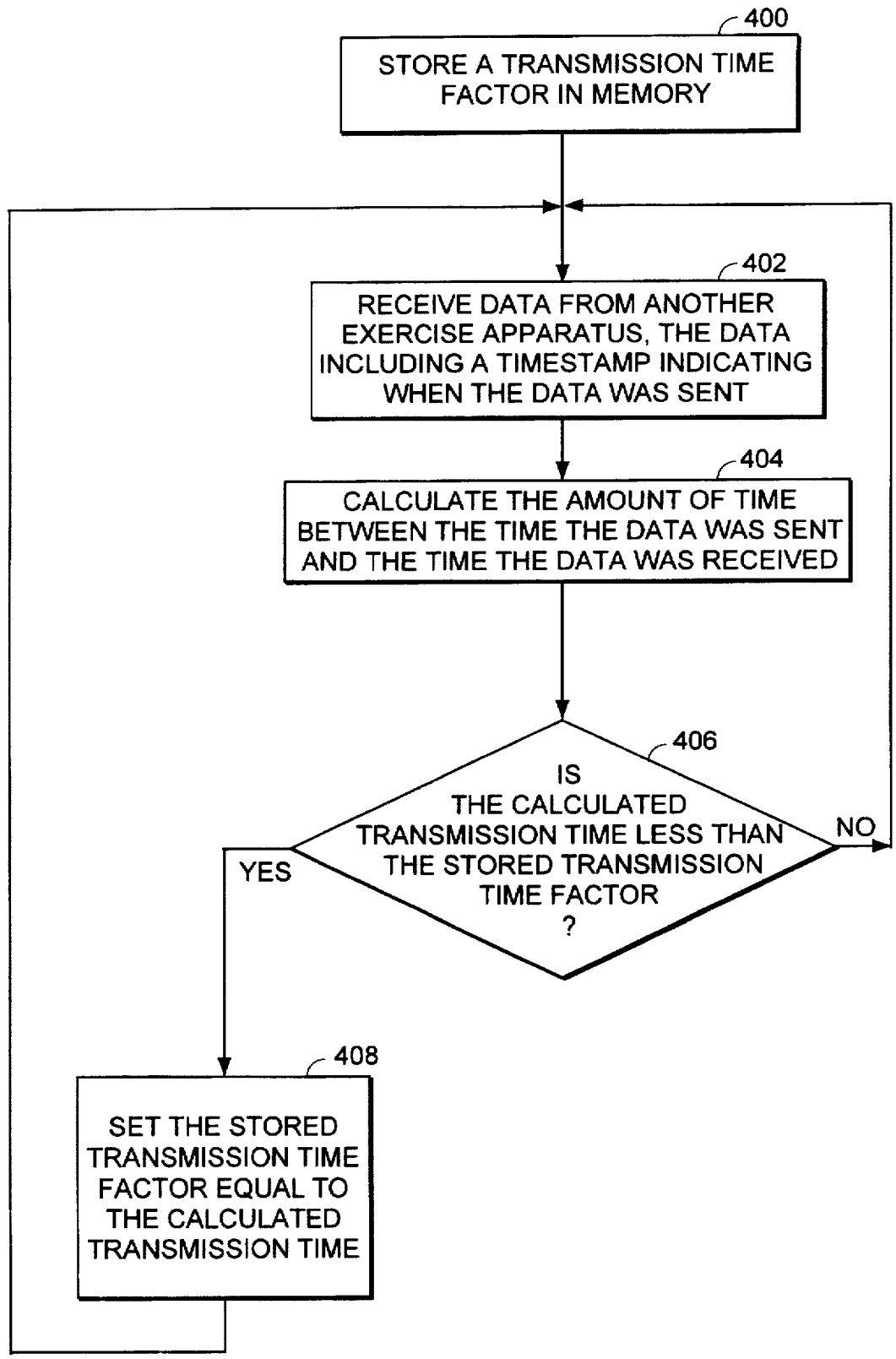
FIG. 23 is a flow chart illustrating one process for synchronizing each of the exercise apparatus in the network of FIG. 7.

Referring to FIG. 23, a flow chart illustrates one process for synchronizing each of the exercise apparatus in a network configured according to the network of FIG. 7, FIG. 8 or FIG. 9. The computer of each exercise apparatus in the network stores a transmission time factor in memory (step 400). The transmission time factor represents the amount of time between the time the data is sent by one exercise apparatus and the time the data is received by the other exercise apparatus in the network. The transmission time factor may be a large or small value depending on the amount of traffic on the network. Each computer slowly increases the value of the stored transmission time factor to compensate for the clocks of each computer not running at the same rate.

Each exercise apparatus in the network receives data from other exercise apparatus in the network (step 402). All data received by an exercise apparatus includes a timestamp indicating when the data was sent. The receiving exercise apparatus calculates the amount of time between the time the data was sent and the time the data was received (step 404). The receiving exercise apparatus then determines if the calculated transmission time is less than the stored transmission time factor (step 406). If the calculated transmission time is not less than the stored transmission time factor, the receiving exercise apparatus retains the value of the stored transmission time factor. A higher calculated transmission time indicates that the data took longer to travel from the transmitting exercise apparatus to the receiving exercise apparatus. If the calculated transmission time is less than the stored transmission time factor, the receiving exercise apparatus sets the stored transmission time factor equal to the calculated transmission time (step 408). After the stored transmission factor is reset, the computer slowly increases the value of the stored transmission time factor until another transmission time value is calculated which is less than the stored value. Resetting the stored transmission time factor only when the calculated value is less that the stored value compensates for network delays. The stored transmission time factor is not updated when the calculated value is greater than the stored value because longer delays are usually due to network variability.

Other modifications and implementations will occur to those skilled in the art without departing from the spirit and scope of the invention as claimed. Accordingly, the invention is to be defined not by the preceding illustrative description but instead by the following claims.

What is claimed is:

1. A method for computerized networked exercising, comprising the steps of:
    (a) providing a first networkable exercise apparatus and a second networkable exercise apparatus, each comprising:
        (i) an exercise mechanism which a user manipulates to achieve exercise;
        (ii) a steering mechanism disposed proximate the exercise mechanism which the user manipulates to indicate direction of motion;
        (iii) a control mechanism disposed proximate the exercise mechanism which the user manipulates to interact with virtual objects in a simulated environment;
        (iv) a computer for generating the simulated environment and for monitoring user manipulation of the exercise, steering and control mechanisms to determine the user's position in the simulated environment and the user's interaction with virtual objects in the simulated environment, the computer including a network interface to allow communication over a communication channel, the computer being configured to enable the user to travel throughout the simulated environment by manipulating the exercise mechanism and the steering mechanism; and
        (v) a display system coupled to the computer for providing a visual display of at least the user's position in the simulated environment;
    (b) associating, in the computer of the first networkable exercise apparatus, a time delay with a predetermined

27 event which the first networkable exercise apparatus causes to occur in the simulated environment;

(c) after the predetermined event occurs in the first networkable exercise apparatus, delaying the generation of the simulated environment for the associated time delay in the first apparatus' computer;

(d) sending data from the first networkable exercise apparatus to the second networkable exercise apparatus via the network interfaces, the data including an indication that the predetermined event occurred in the first networkable exercise apparatus and a timestamp indicating when the predetermined event occurred;

(e) processing, in the second apparatus' computer, the data received from the first apparatus to determine results of the predetermined event in the simulated environment; and (f) after the time delay associated with the predetermined event, displaying on the display system of each networkable exercise apparatus, the results of the predetermined event in the simulated environment.

2. The method of claim 1 wherein the step of providing a first networkable apparatus and a second networkable apparatus, further comprises the step of providing a computer configured to enable the user to interact with virtual objects in the simulated environment for each networkable apparatus.

3. An interactive exercise system, comprising:

a plurality of networkable exercise apparatus, each comprising:

(i) an exercise mechanism which a user manipulates to achieve exercise;

(ii) a steering mechanism disposed proximate the exercise mechanism which the user manipulates to indicate direction of motion;

(iii) a control mechanism disposed proximate the exercise mechanism which the user manipulates to interact with virtual objects in a simulated environment;

(iv) a processor comprising:

a network interface to allow communication over a communication channel;

a first module generating the simulated environment;

a second module monitoring user manipulation of the exercise, steering and control mechanisms to determine the user's position in the simulated environment and the user's interaction with virtual objects in the simulated environment;

a third module associating a time delay with a predetermined event which each of the networkable exercise apparatus causes to occur in the simulated environment, after the predetermined event occurs, the third module delaying the computer simulation in the computer of the apparatus in which the event occurred for the associated time delay and sending data to other networkable exercise apparatus via the network interfaces, the data including an indication that the predetermined event occurred and a timestamp indicating when the predetermined event occurred; and a fourth module processing data received from other exercise apparatus to determine results in the simulated environment of predetermined events occurring in the other exercise apparatus, the processor being configured to enable the user to travel throughout the simulated environment by manipulating the exercise mechanism and the steering mechanism; and

28

(v) a display system coupled to the computer for providing a visual display of at least the user's position in the simulated environment, wherein after the predetermined event occurs and the associated time delay passes, the display system displays the results of the event in the simulated environment.

4. The interactive exercise system of claim 2 wherein the processor of each of the plurality of networkable exercise apparatus is configured to enable the user to interact with virtual objects in the simulated environment.

5. A method for computerized networked exercising, comprising the steps of:

(a) providing a first networkable exercise apparatus and a second networkable exercise apparatus, each comprising:

(i) an exercise mechanism which a user manipulates to achieve exercise;

(ii) a steering mechanism disposed proximate the exercise mechanism which the user manipulates to indicate direction of motion;

(iii) a computer for generating a simulated environment and for monitoring user manipulation of the exercise and steering mechanisms to determine the user's position in the simulated environment, the computer including an interface to allow communication over a network, the computer storing in memory a transmission time factor, the computer being configured to enable the user to travel throughout the simulated environment by manipulating the exercise mechanism and the steering mechanism; and (iv) a display system coupled to the computer for providing a visual display of at least the user's position in the simulated environment;

(b) sending data from the first networkable exercise apparatus to the second networkable exercise apparatus via the interfaces, the data including a timestamp indicating when the data was sent;

(c) processing, in the second apparatus' computer, the data received from the first apparatus to calculate the amount of time between the time the data was sent from the first apparatus and the time the data was received by the second apparatus; and (d) setting the stored transmission time factor equal to the calculated amount of time in the computer of the second apparatus when the calculated amount of time is less than the stored transmission time factor.

6. An interactive exercise system, comprising:

a plurality of networkable exercise apparatus, each comprising:

(i) an exercise mechanism which a user manipulates to achieve exercise;

(ii) a steering mechanism disposed proximate the exercise mechanism which the user manipulates to indicate direction of motion;

(iii) a processor comprising:

an interface to allow communication over a network;

a first module generating the simulated environment;

a second module monitoring user manipulation of the exercise and steering mechanisms to determine user position in the simulated environment;

a third module storing a transmission time factor, the third module sending data from its respective networkable exercise apparatus to other networkable exercise apparatus via the interfaces, the data including a timestamp indicating when the data was sent; and a fourth module processing data received from other exercise apparatus to calculate the amount of time between the time the data was sent by the other apparatus and the time the data was received by the fourth module, the fourth module setting the stored transmission time factor in the third module equal to the calculated amount of time when the calculated amount of time is less than the stored transmission time, the processor being configured to enable the user to travel throughout the simulated environment by manipulating the exercise mechanism and the steering mechanism; and (iv) a display system coupled to the computer for providing a visual display of at least the user's position in the simulated environment.

7. An interactive exercise system for playing a competitive game, comprising:

a plurality of networkable exercise apparatus, each comprising:
  (i) an exercise mechanism which a user manipulates to achieve exercise;
  (ii) a steering mechanism disposed proximate the exercise mechanism which the user manipulates to indicate direction of motion;
  (iii) a control mechanism disposed proximate the exercise mechanism which the user manipulates to interact with virtual objects in a simulated environment;
  (iv) a processor comprising:
    a network interface to allow communication over a communication channel;
    a first module generating the simulated environment, the simulated environment comprising an enclosed space representing a game field and at least one virtual object;
    a second module monitoring user manipulation of the exercise, steering and control mechanisms to determine user position in the simulated environment and user interaction with the at least one virtual object in the simulated environment;
    a third module associating a point value with a predetermined event which each of the networkable exercise apparatus causes to occur in the simulated environment, after the predetermined event occurs, the third module sending data to other networkable exercise apparatus via the network interfaces, the data including an indication that the predetermined event occurred; and
    a fourth module monitoring each occurrence of the predetermined event in each networkable exercise apparatus, determining a scoring exercise apparatus, and tabulating points earned by each exercise apparatus, the processor being configured to enable the user to travel throughout the simulated environment and to interact with the virtual object in the simulated environment by manipulating the exercise, steering and control mechanisms; and (v) a display system coupled to the computer for providing a visual display of at least the user's position in the simulated environment.

8. An interactive exercise system for playing a competitive game, comprising:

a plurality of networkable exercise apparatus, each comprising:
  (i) an exercise mechanism which a user manipulates to achieve exercise;
  (ii) a steering mechanism disposed proximate the exercise mechanism which the user manipulates to indicate direction of motion;
  (iii) a control mechanism disposed proximate the exercise mechanism which the user manipulates to interact with virtual objects in a simulated environment;
  (iv) a processor comprising:
    a network interface to allow communication over a communication channel;
    a first module generating the simulated environment, the simulated environment comprising an enclosed space representing a game field, at least one virtual goal, and a virtual game ball;
    a second module monitoring user manipulation of the exercise, steering and control mechanisms to determine user position in the simulated environment and user interaction with the virtual game ball in the simulated environment;
    a third module associating a point value with an entry of the virtual game ball into the at least one virtual goal; and
    a fourth module monitoring each entry of the virtual game ball into the at least one virtual goal in each networkable exercise apparatus, determining a scoring exercise apparatus, and tabulating points earned by each exercise apparatus, the processor being configured to enable the user to travel throughout the simulated environment and to interact with the virtual game ball in the simulated environment by manipulating the exercise, steering and control mechanisms; and (v) a display system coupled to the computer for providing a visual display of at least the user's position in the simulated environment.

* * * * *